(12) United States Patent
Mizuta et al.

(10) Patent No.: US 8,482,862 B2
(45) Date of Patent: Jul. 9, 2013

(54) VARIABLE POWER OPTICAL SYSTEM FOR STEREOMICROSCOPE

(75) Inventors: Masahiro Mizuta, Yokohama (JP); Fumio Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/161,758

(22) Filed: Jun. 16, 2011

(65) Prior Publication Data

US 2011/0242648 A1   Oct. 6, 2011

Related U.S. Application Data

(63) Continuation of application No. PCT/JP2009/007001, filed on Dec. 18, 2009.

(30) Foreign Application Priority Data

Dec. 22, 2008   (JP) .................. 2008-325485

(51) Int. Cl.
*G02B 15/14* (2006.01)
*G02B 15/177* (2006.01)
*G02B 15/173* (2006.01)

(52) U.S. Cl.
CPC ............ *G02B 15/177* (2013.01); *G02B 15/173* (2013.01)
USPC .......................................... 359/686; 359/676

(58) Field of Classification Search
USPC ................ 359/554–557, 676–690, 368, 380, 359/821
See application file for complete search history.

(56) References Cited

U.S. PATENT DOCUMENTS

| 3,507,555 | A | * | 4/1970 | Masaki ......................... 359/686 |
| 6,157,495 | A | * | 12/2000 | Kawasaki ..................... 359/686 |
| 6,320,702 | B1 | * | 11/2001 | Yonezawa ..................... 359/686 |
| 6,335,833 | B1 | | 1/2002 | Kawasaki |
| 6,816,321 | B2 | * | 11/2004 | Zimmer et al. ............... 359/686 |
| 6,891,684 | B2 | * | 5/2005 | Taki ............................. 359/773 |
| 7,072,119 | B2 | | 7/2006 | Kawasaki |
| 7,362,510 | B2 | * | 4/2008 | Nanjo et al. .................. 359/687 |
| 2005/0174655 | A1 | * | 8/2005 | Straehle et al. .............. 359/676 |

FOREIGN PATENT DOCUMENTS

| JP | 11-95099 | 4/1999 |
| JP | 2004-138963 | 5/2004 |
| JP | 2005-91755 | 4/2005 |

* cited by examiner

*Primary Examiner* — Thong Nguyen

(57) ABSTRACT

An optical system including, in order from an object: a first lens group having positive refractive power; a second lens group having negative refractive power; a third lens group having positive refractive power; and a fourth lens group having negative refractive power. The second lens group has, in order from the object, a front group having negative refractive power and a rear group. In various embodiments, the following conditional expressions are satisfied, $0.4<f2F/f2<1.6$ and $-3.0<q2<-0.3$ where f2 denotes a focal length of the second lens group, f2F denotes a focal length of the front group, and q2 denotes a form factor of a negative lens disposed closest to the object of the front group.

7 Claims, 32 Drawing Sheets

EXAMPLE 1

EXAMPLE 1

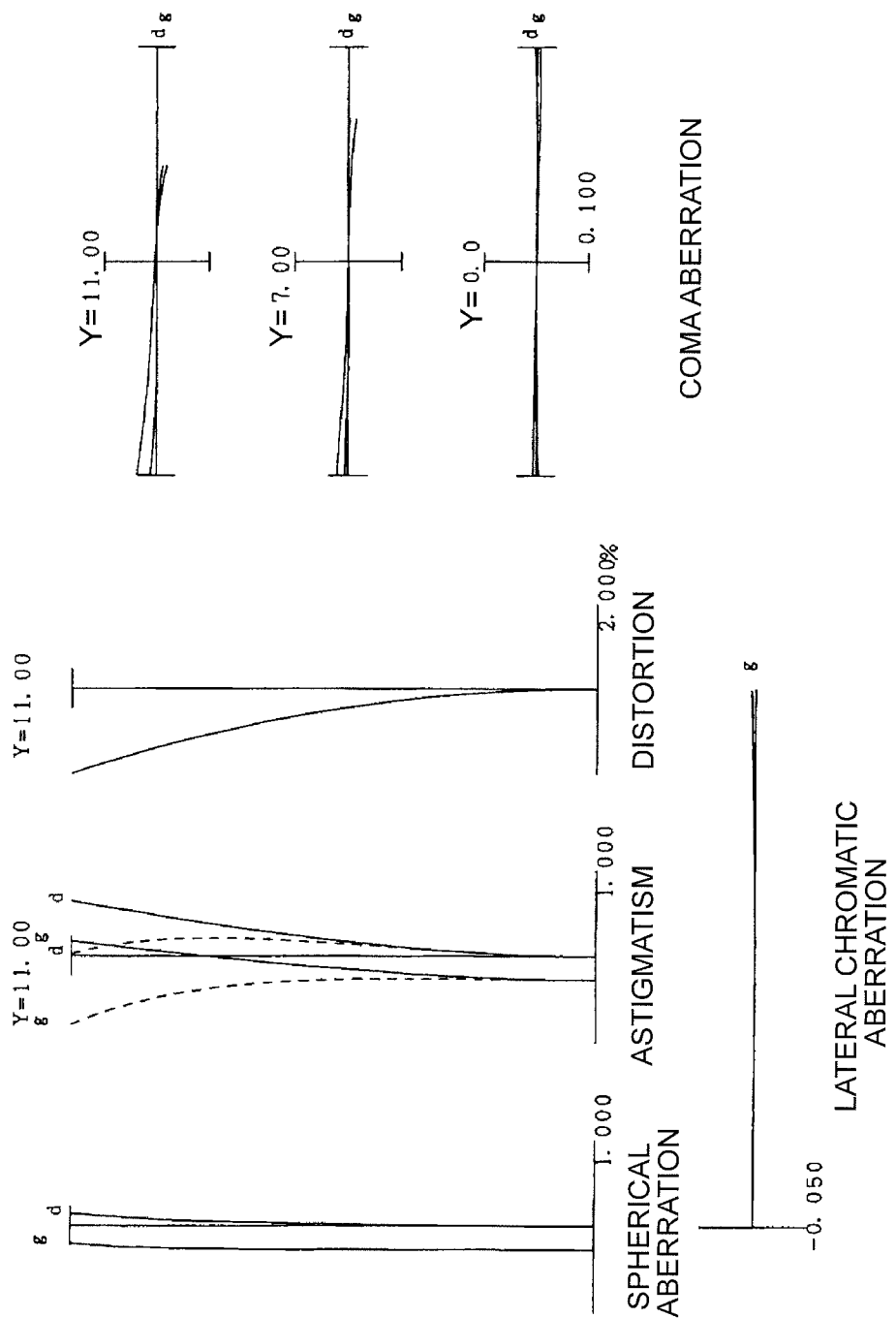

EXAMPLE 2

EXAMPLE 3

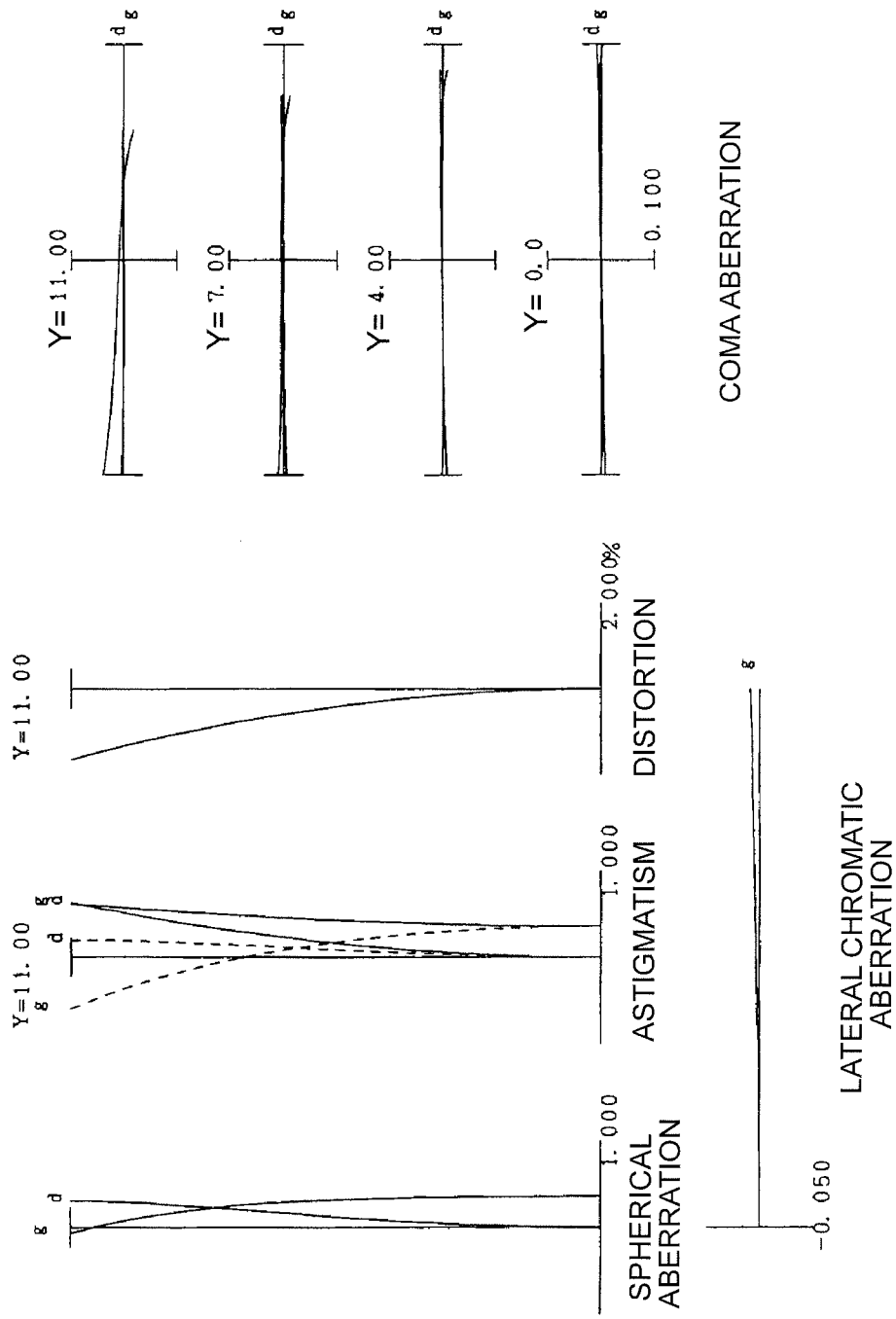

EXAMPLE 4

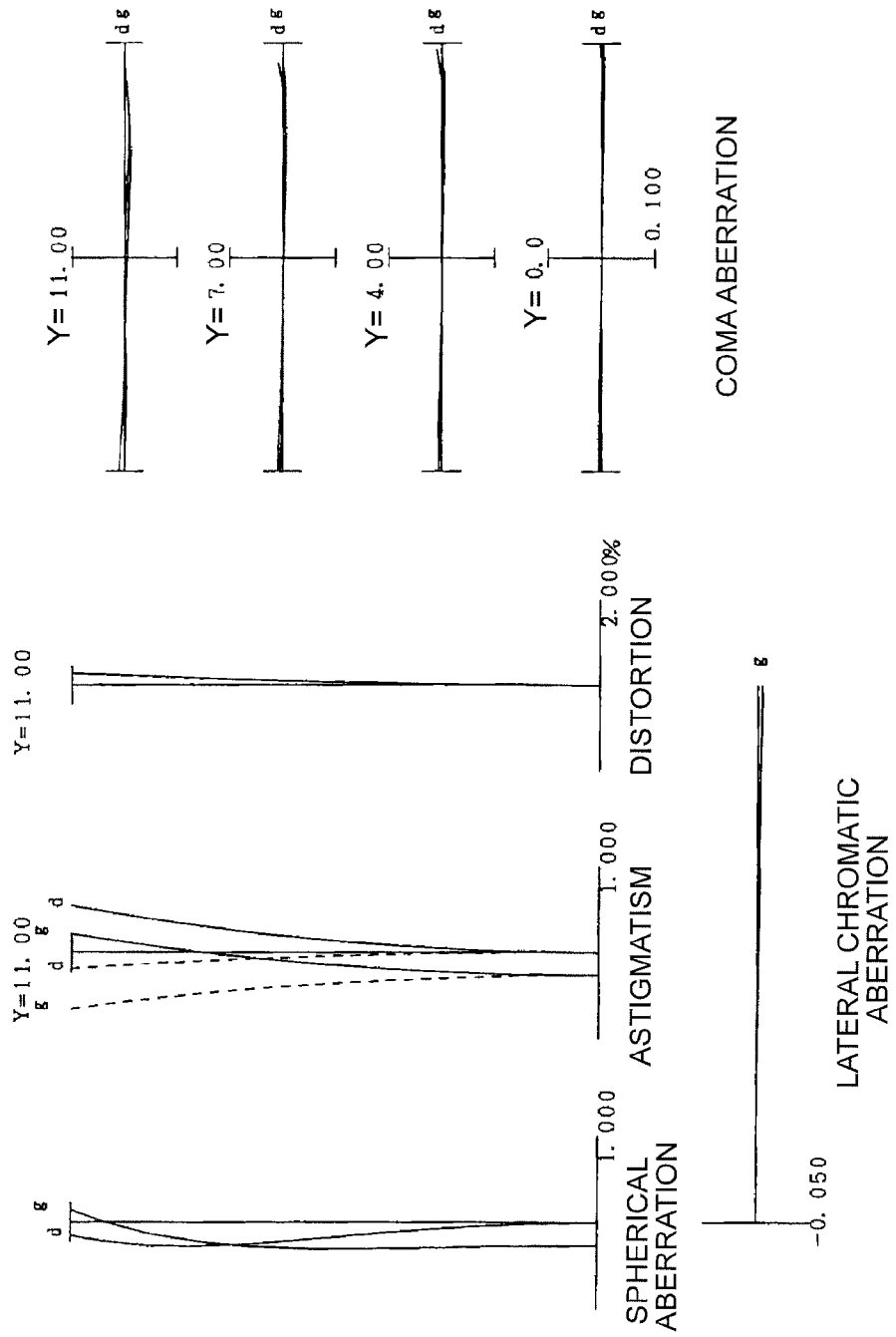

EXAMPLE 5

EXAMPLE 6

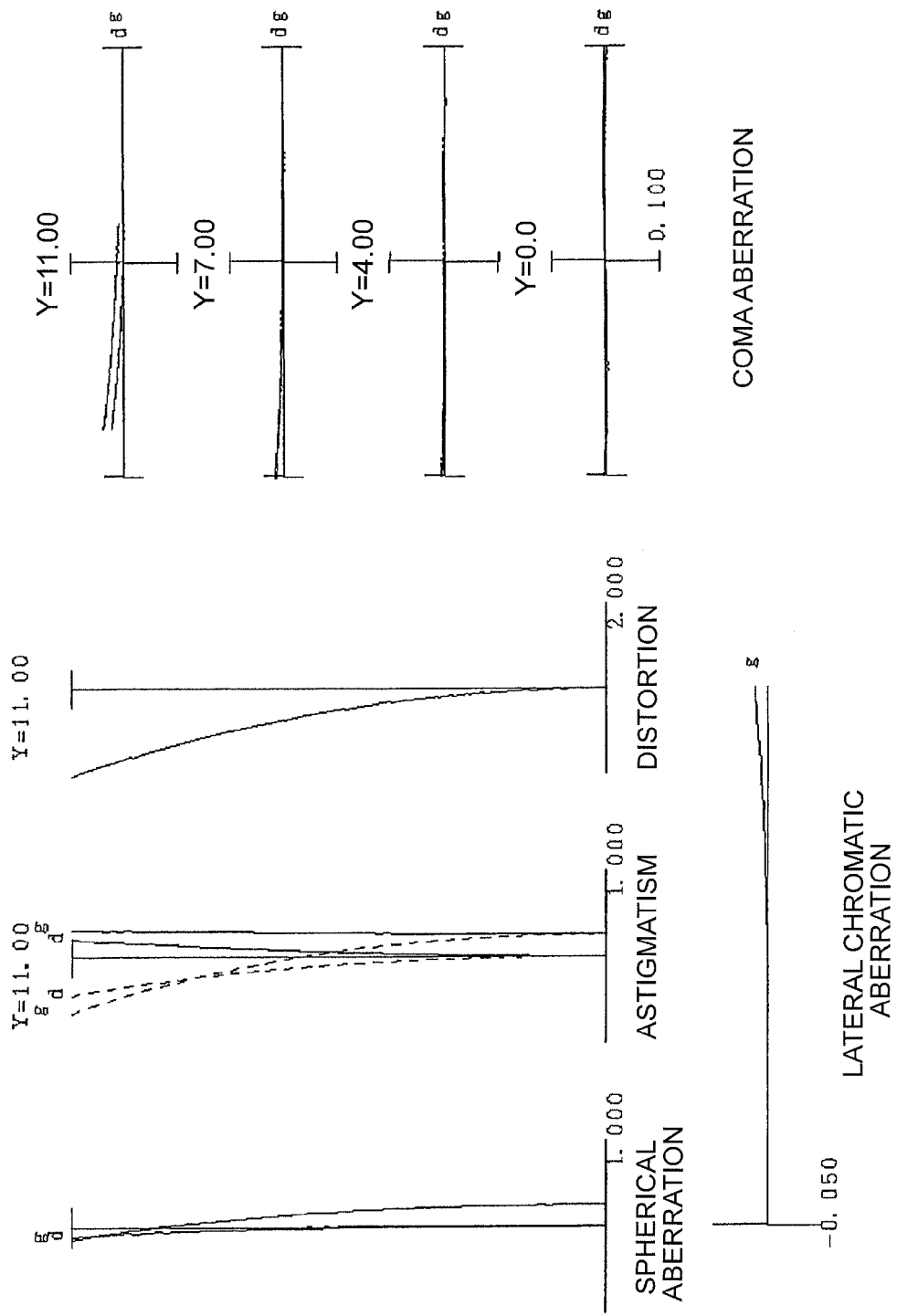

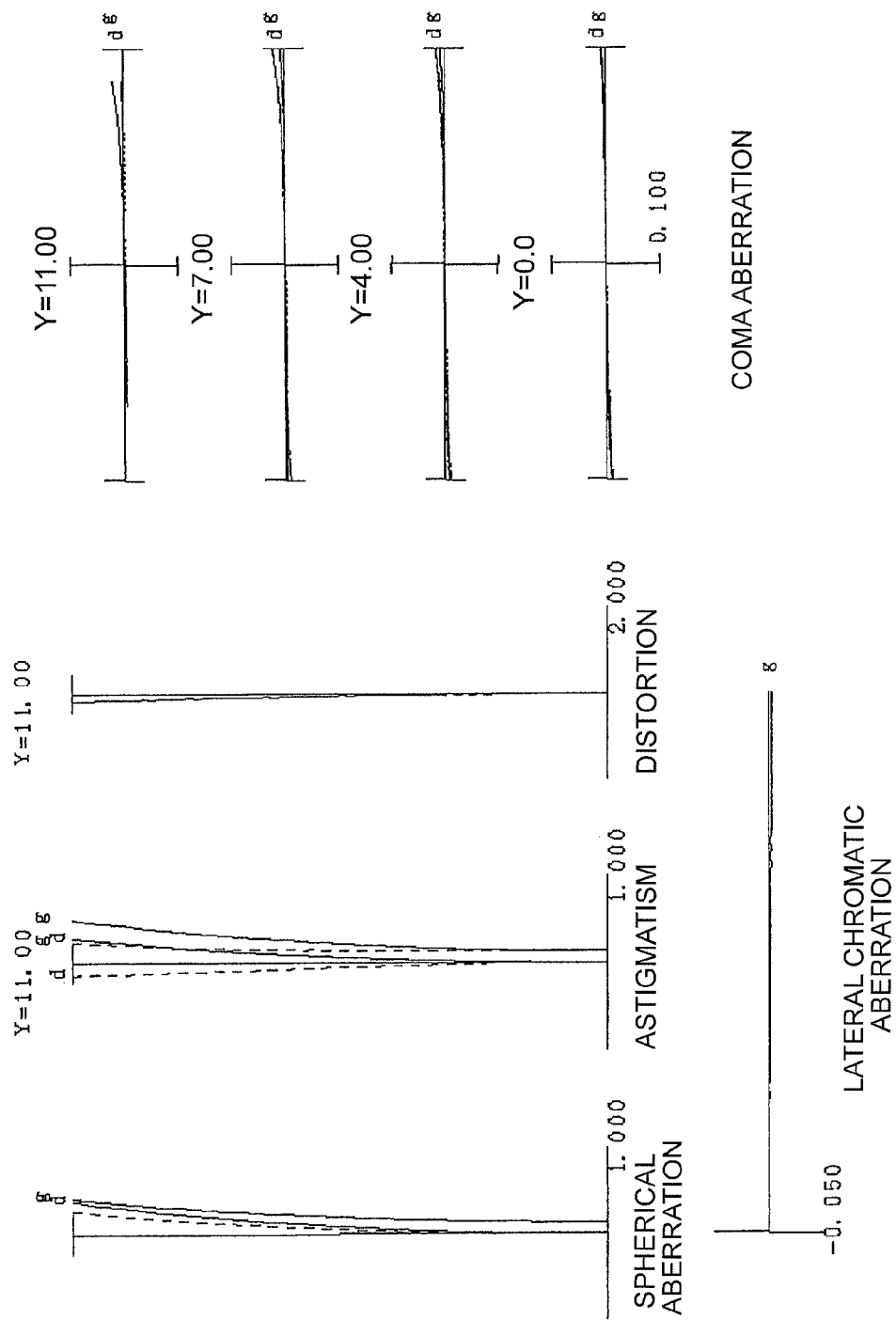

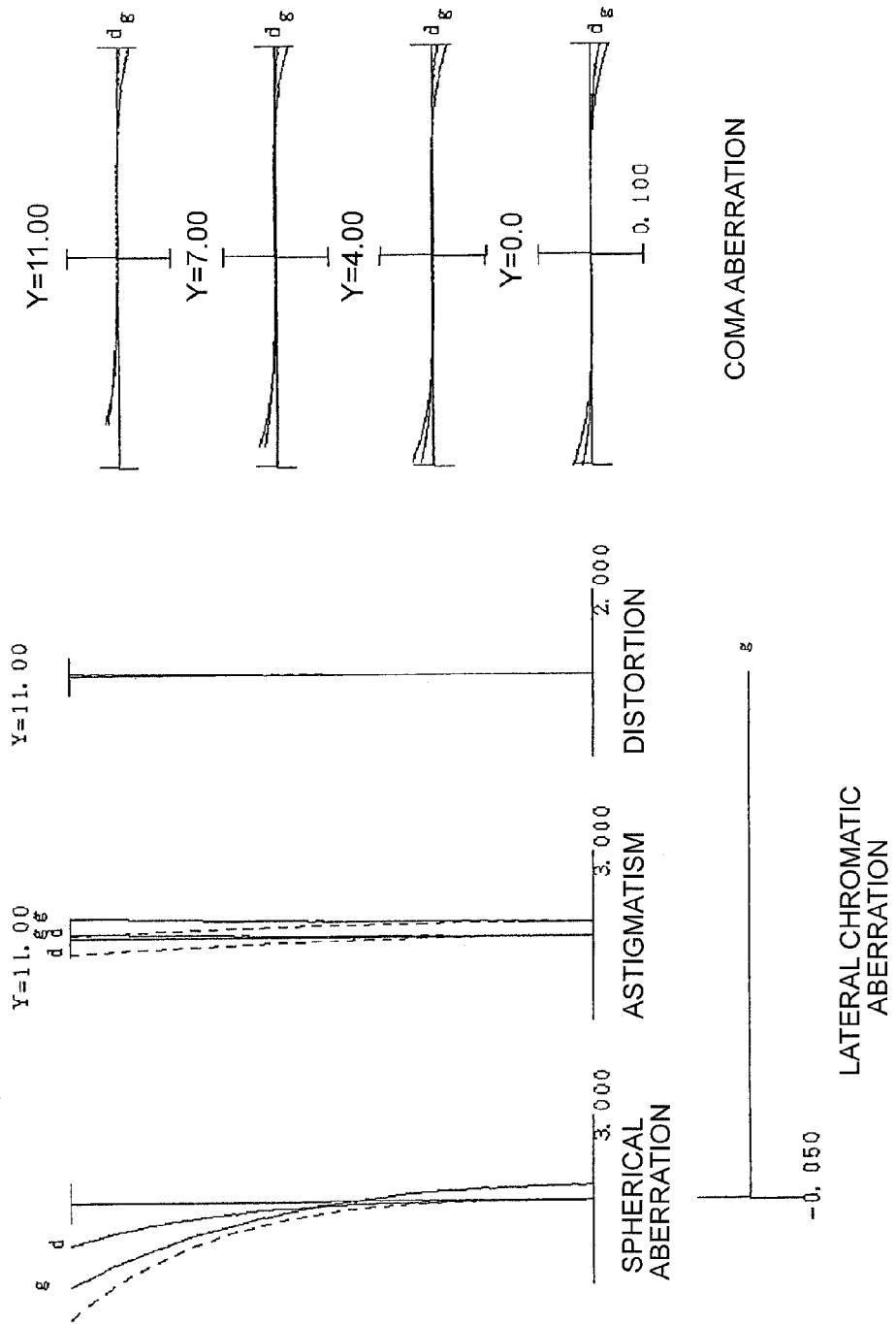

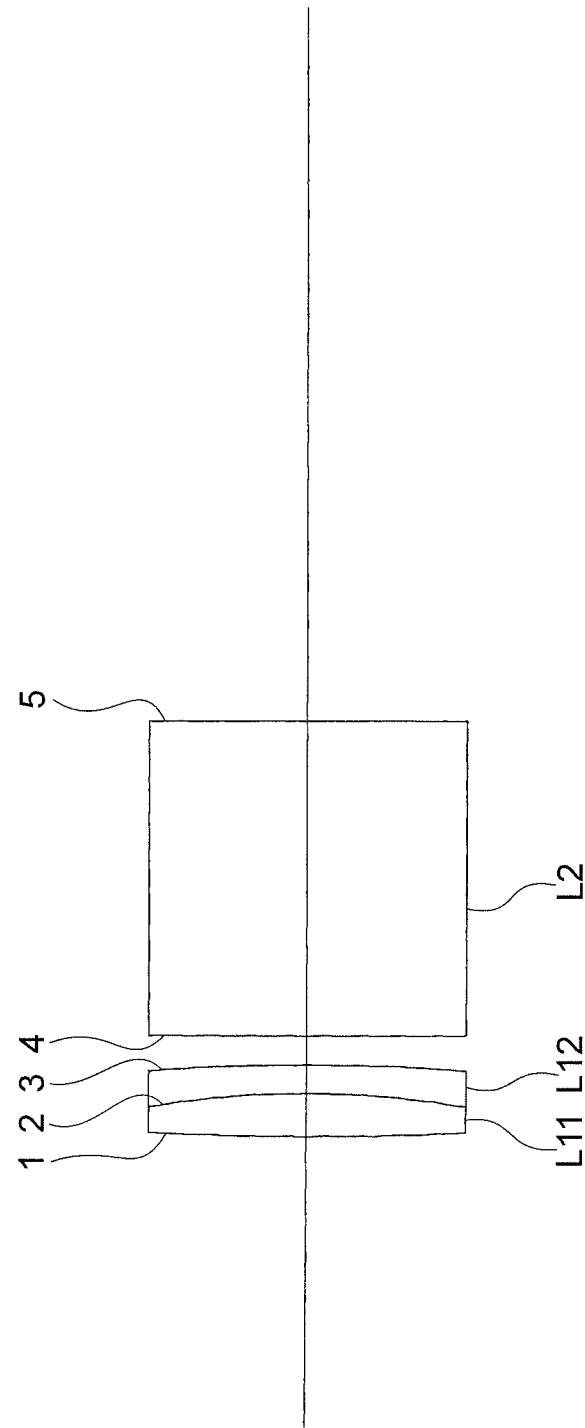

VARIABLE POWER OPTICAL SYSTEM FOR STEREOMICROSCOPE

CROSS-REFERENCE TO RELATED APPLICATION (S)

This is a continuation of PCT International Application No. PCT/JP2009/007001, filed on Dec. 18, 2009, which is hereby incorporated by reference. This application also claims the benefit of Japanese Patent Application No. 2008-325485, filed in Japan on Dec. 22, 2008, which is hereby incorporated by reference.

BACKGROUND

Field

Various embodiments of the present invention relate to a variable power optical system for a stereomicroscope.

TECHNICAL BACKGROUND

Description of the Related Art

Conventionally, various variable power optical systems used for stereomicroscopes have been proposed. For example, a variable power optical system, including five lens groups having, in order from an object, positive, negative, negative, positive and negative refractive power, has been proposed (e.g. see Patent Literature 1).

PATENT DOCUMENT

PATENT DOCUMENT 1: Japanese Laid-Open Patent Publication No. 2005-91755(A)

SUMMARY OF VARIOUS EMBODIMENTS OF THE PRESENT INVENTION

For a stereomicroscope, a bright object optical system having a large numerical aperture and a variable power optical system having wide variable power range are demanded. Conventionally, however, if a variable power range of the variable power optical system is wide, a numerical aperture of the objective optical system becomes small, and if a numerical aperture of the objective optical system is large, on the other hand, the variable power range of the variable power optical system becomes narrow, and both are insufficient to satisfy demanded specifications.

With the foregoing in view, various embodiments of the present invention provide a variable power optical system for a stereomicroscope which has a wide variable power range and can correct aberrations well, while ensuring a large numerical aperture of an objective optical system.

A variable power optical system for a stereomicroscope of various embodiments of the present invention includes, in order from an object: a first lens group having positive refractive power; a second lens group having negative refractive power; an aperture stop; a third lens group having positive refractive power; and a fourth lens group having negative refractive power, wherein the second lens group includes, in order from the object, a front group having negative refractive power and a rear group having an achromatic cemented lens including a positive lens and a negative lens, the second lens group and the third lens group move in opposite directions along an optical axis at least in a part of a variable power block, and the following conditional expressions are satisfied: $0.4 < f2F/f2 < 1.6$ and $-3.0 < q2 < -0.3$ where $f2$ denotes a focal length of the second lens group, $f2F$ denotes a focal length of the front group constituting the second lens group, and $q2$ denotes a form factor of a negative lens disposed closest to the object in the front group constituting the second lens group (the form factor $q2$ is defined by $q2=(r22+r21)/(r22-r21)$, where $r21$ denotes a radius of curvature of an object side lens surface of the negative lens, and $r22$ denotes a radius of curvature of an image side lens surface of the negative lens).

Moreover, in various embodiments of the present invention, the first lens group include a negative lens disposed closest to the object, and the following conditional expression be satisfied: $-0.3 < f2/f1 < -0.2$ where $f1$ denotes a focal length of the first lens group, and $f2$ denotes a focal length of the second lens group.

Further, in various embodiments of the present invention, the positive lens constituting the cemented lens in the rear group of the second lens group satisfy the following conditional expressions: $T360 \geqq 0.5$ and $vd2 < 40$ where $T360$ denotes an internal transmittance at wavelength 360 nm without reflection loss when a thickness of an optical material to be used is 10 mm, and $vd2$ denotes an Abbe number of the optical material to be used.

According to various embodiments of the present invention, a variable power optical system for a stereomicroscope which has a wide variable power range and can correct aberrations well, while ensuring a large numerical aperture of an objective optical system, can be provided.

Various embodiments of the present invention are described above. However, not all embodiments of the present invention include all the features described in the above embodiments.

BRIEF DESCRIPTION OF THE DRAWINGS

FIG. 1A shows a lowest magnification state, FIG. 1B shows an intermediate magnification state, and FIG. 1C shows a highest magnification state, according to various embodiments of the present invention;

FIGS. 2A to 2C are graphs showing various aberrations of the variable power optical system according to Example 1, where FIG. 2A shows the lowest magnification state, FIG. 2B shows the intermediate magnification state, and FIG. 2C shows the highest magnification state, according to various embodiments of the present invention;

FIG. 3A shows a lowest magnification state, FIG. 3B shows an intermediate magnification state, and FIG. 3C shows a highest magnification state, according to various embodiments of the present invention;

FIG. 4A shows the lowest magnification state, FIG. 4B shows the intermediate magnification state, and FIG. 4C shows the highest magnification state, according to various embodiments of the present invention;

FIG. 5A shows a lowest magnification state, FIG. 5B shows an intermediate magnification state, and FIG. 5C shows a highest magnification state, according to various embodiments of the present invention;

FIGS. 6A to 6C are graphs showing various aberrations of the variable power optical system according to Example 3, where FIG. 6A shows the lowest magnification state, FIG. 6B shows the intermediate magnification state, and FIG. 6C shows the highest magnification state, according to various embodiments of the present invention;

FIG. 7A shows a lowest magnification state, FIG. 7B shows an intermediate magnification state, and FIG. 7C shows a highest magnification state, according to various embodiments of the present invention;

FIGS. 8A to 8C are graphs showing various aberrations of the variable power optical system according to Example 4, where FIG. 8A shows the lowest magnification state, FIG. 8B shows the intermediate magnification state, and FIG. 8C shows the highest magnification state, according to various embodiments of the present invention;

FIG. 9A shows a lowest magnification state, FIG. 9B shows an intermediate magnification state, and FIG. 9C shows a highest magnification state, according to various embodiments of the present invention;

FIG. 10A shows the lowest magnification state, FIG. 10B shows the intermediate magnification state, and FIG. 10C shows the highest magnification state, according to various embodiments of the present invention;

FIG. 11A shows a lowest magnification state, FIG. 11B shows an intermediate magnification state, and FIG. 11C shows a highest magnification state, according to various embodiments of the present invention;

FIGS. 12A to 12C are graphs showing various aberrations of the variable power optical system according to Example 6, where FIG. 12A shows the lowest magnification state, FIG. 12B shows the intermediate magnification state, and FIG. 12C shows the highest magnification state, according to various embodiments of the present invention;

FIG. 13 is a cross-sectional view depicting a configuration of an image optical system which is combined with each example, according to various embodiments of the present invention;

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF EMBODIMENTS

Various embodiments of the present invention will now be described with reference to the drawings.

Figure 14:
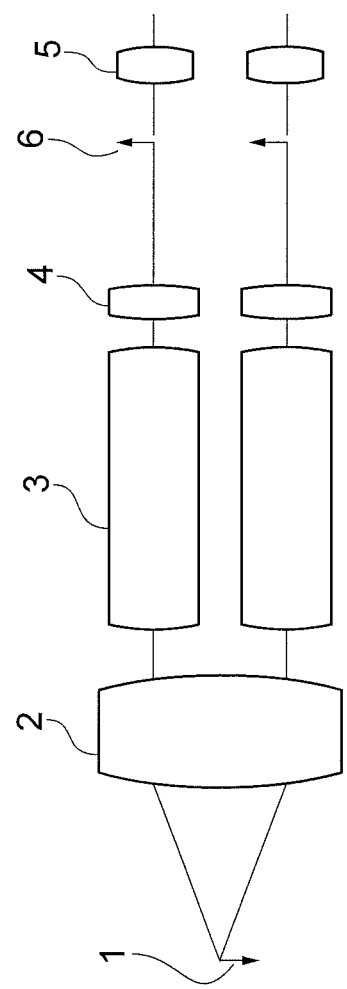
FIG. 14 is a diagram depicting a configuration of a stereomicroscope using the variable power optical system according to various embodiments of the present embodiment.

First a stereomicroscope (parallel system single objective lens type binocular microscope) using a variable power optical system according to the present embodiment will be described. As FIG. 14 shows, the parallel system stereomicroscope according to the present embodiment has, in order from an object 1, one objective optical system 2, and two variable power optical systems 3, two image optical systems 4, and two ocular optical systems 5 for a left eye and a right eye, which are disposed in parallel with the optical axis of the objective optical system 2, where lights from the object 1 are converted into parallel luminous flux by the objective optical system 2, an image 6 is formed by the image optical systems 4 via the variable power optical systems 3, and the image 6 is observed by the ocular optical system 5. In the case of the stereomicroscope having this configuration, a bumpy object can be observed with a stereoscopic sense that is similar to viewing the object directly with both eyes (stereoscopic vision), hence the distance relationship between a tool, such as a tweezers, and an object can be easily grasped when looking through the microscope. Therefore the stereomicroscope is particularly effective in a precision instrument industry, and in a field that requires fine work, such as vivisection and surgery.

Lately good aberration correction, more compactness and lighter weight as well as a wider variable power range and higher resolution are demanded for stereomicroscopes.

Figure 15:
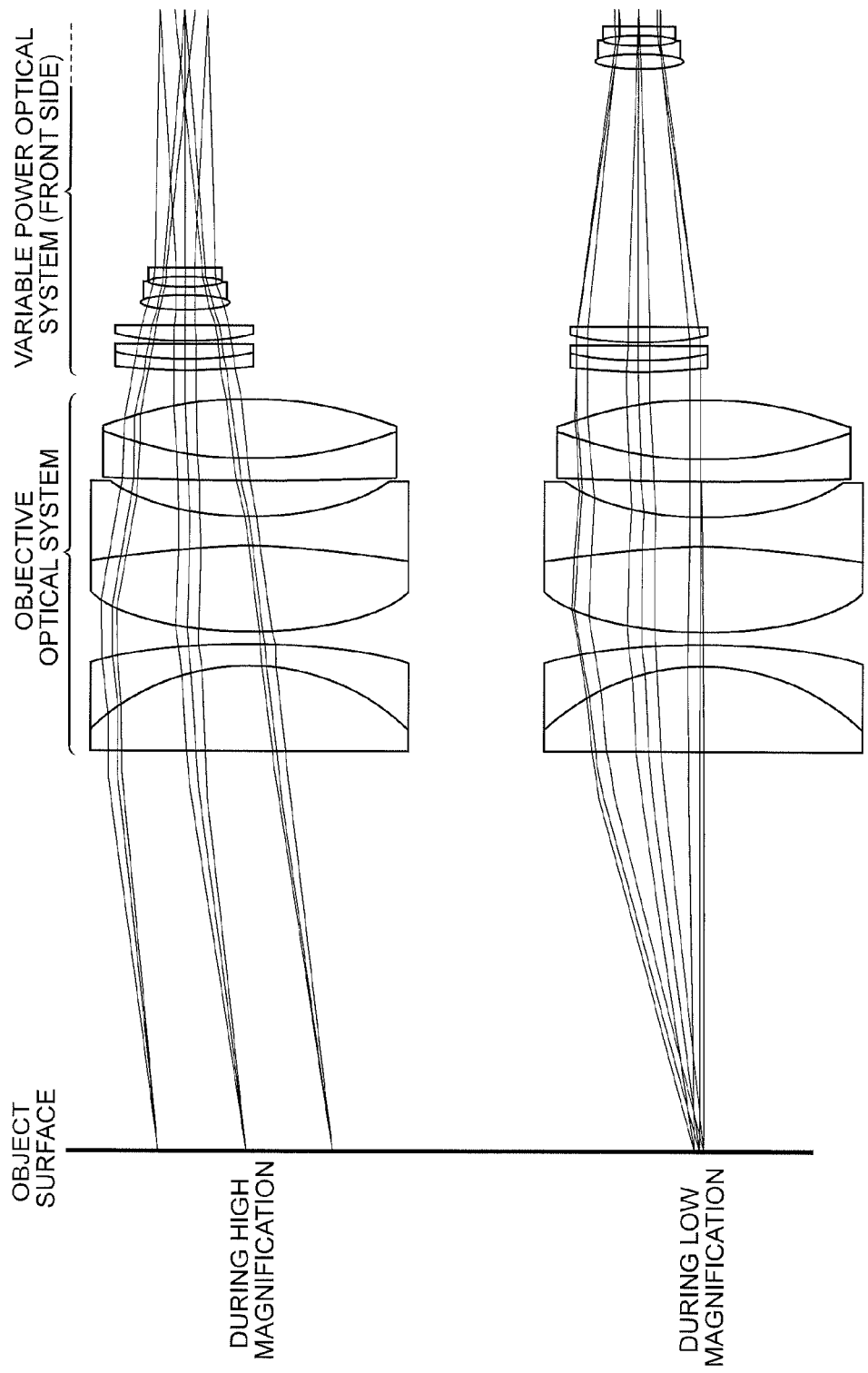
FIG. 15 is a diagram depicting a difference of positions of a luminous flux between during a low magnification and during a high magnification, in an objective optical system which is combined with the variable power optical system according to various embodiments of the present embodiment.

As FIG. 15 shows, in an objective optical system constituting a stereomicroscope, a position of a luminous flux passing through the object optical system (eccentric distance of the incident luminous flux from the optical axis of the objective optical system) differs greatly between low magnification and high magnification. Therefore if it is attempted to satisfy the need of expanding the variable power range, the difference of the luminous flux passing position further increases in the objective optical system. As a result, the objective optical system becomes larger and heavier, which is not desirable.

Figure 16:
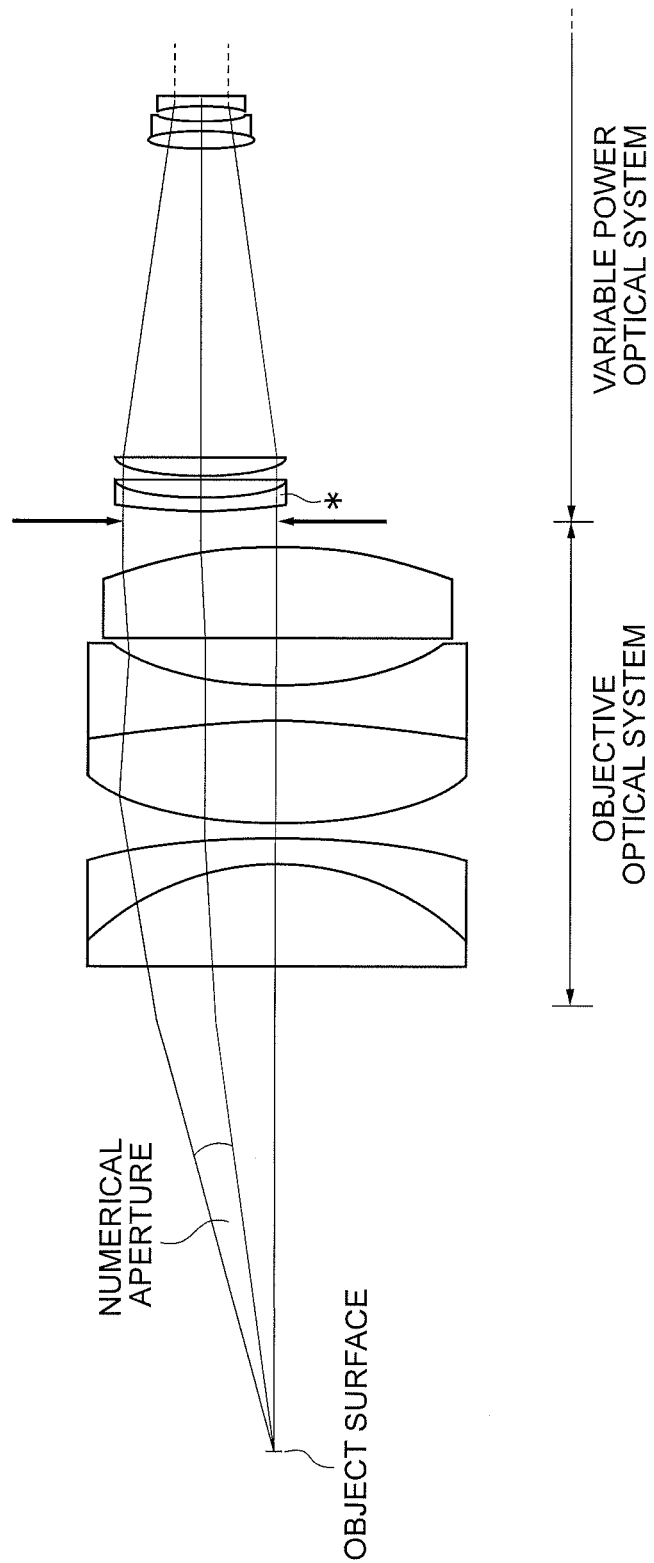
FIG. 16 is a diagram depicting a relationship of a size of an object side numerical aperture of the objective optical system which is combined with the variable power optical system according to various embodiments of the present embodiment, and a size of an effective aperture of a lens closest to the object of this variable optical system.
Figure 17:
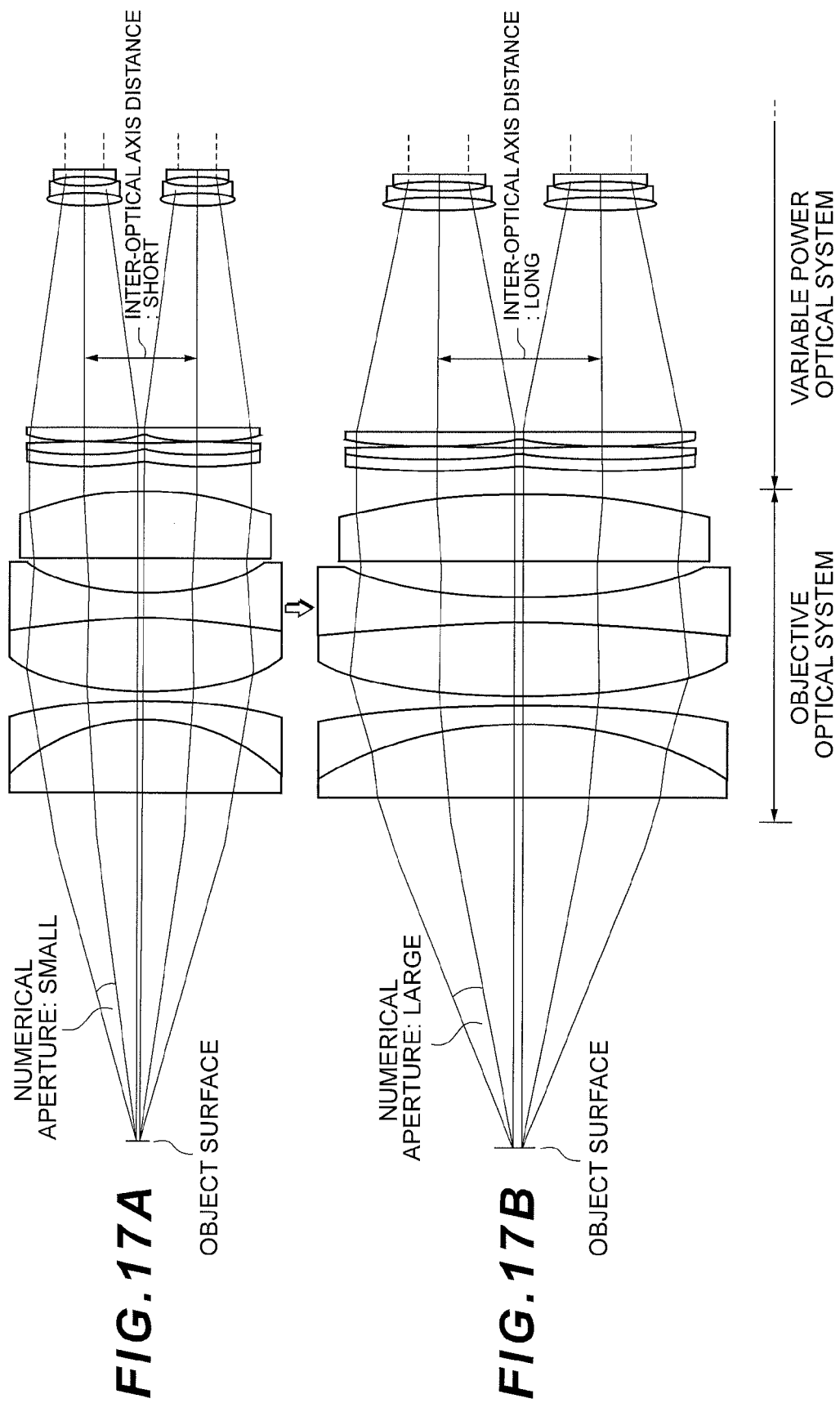
FIGS. 17A and 17B are diagrams depicting a relationship of an inter-optical axis distance of the variable power optical system according to various embodiments of the present embodiment, and an object side numerical aperture of the objective optical system which is combined with the optical system.

In order to satisfy the demand of improving resolution, increasing the object side numerical aperture of the objective optical system is required. As FIG. 16 shows, the size of the object side numerical aperture of the objective optical system during high magnification is restricted by the size of the effective aperture of a lens closest to the object (lens indicated by * in FIG. 16) constituting the variable power optical system. However as FIG. 17A shows, the two variable power optical systems are close to each other, and the only way to increase the effective aperture of the lens closest to the object in the optical system is expanding the inter-optical axis distance between these two variable power optical systems. As a result, the effective aperture of the objective optical system must be increased as shown in FIG. 17B, in other words, the optical system becomes larger and heavier, which is not desirable.

As described above, a very difficult optical design is required if it is attempted to increase the variable power range and improve the resolution using the objective optical system for a parallel system stereomicroscope.

In the present embodiment, attention is turned to a variable power optical system. Various variable power optical systems have been proposed for stereomicroscopes. Any of these variable power optical systems is an afocal optical system, and as mentioned above, the variable power optical system change the diameter of the parallel luminous flux emitted from the objective optical system so as to emit the luminous flux in parallel and relay the parallel luminous flux to the image optical system (see FIG. 14).

Figure 18:
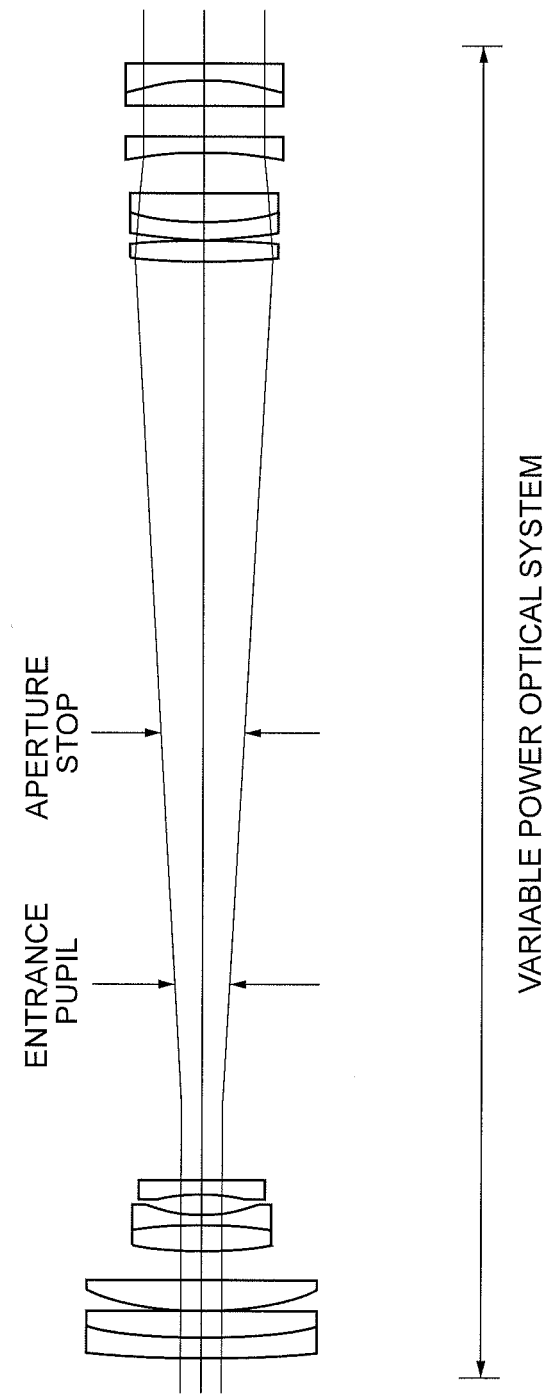
FIG. 18 is a diagram depicting an aperture stop and an entrance pupil, which is an image thereof, in the variable power optical system according to various embodiments of the present embodiment.
Figure 19:
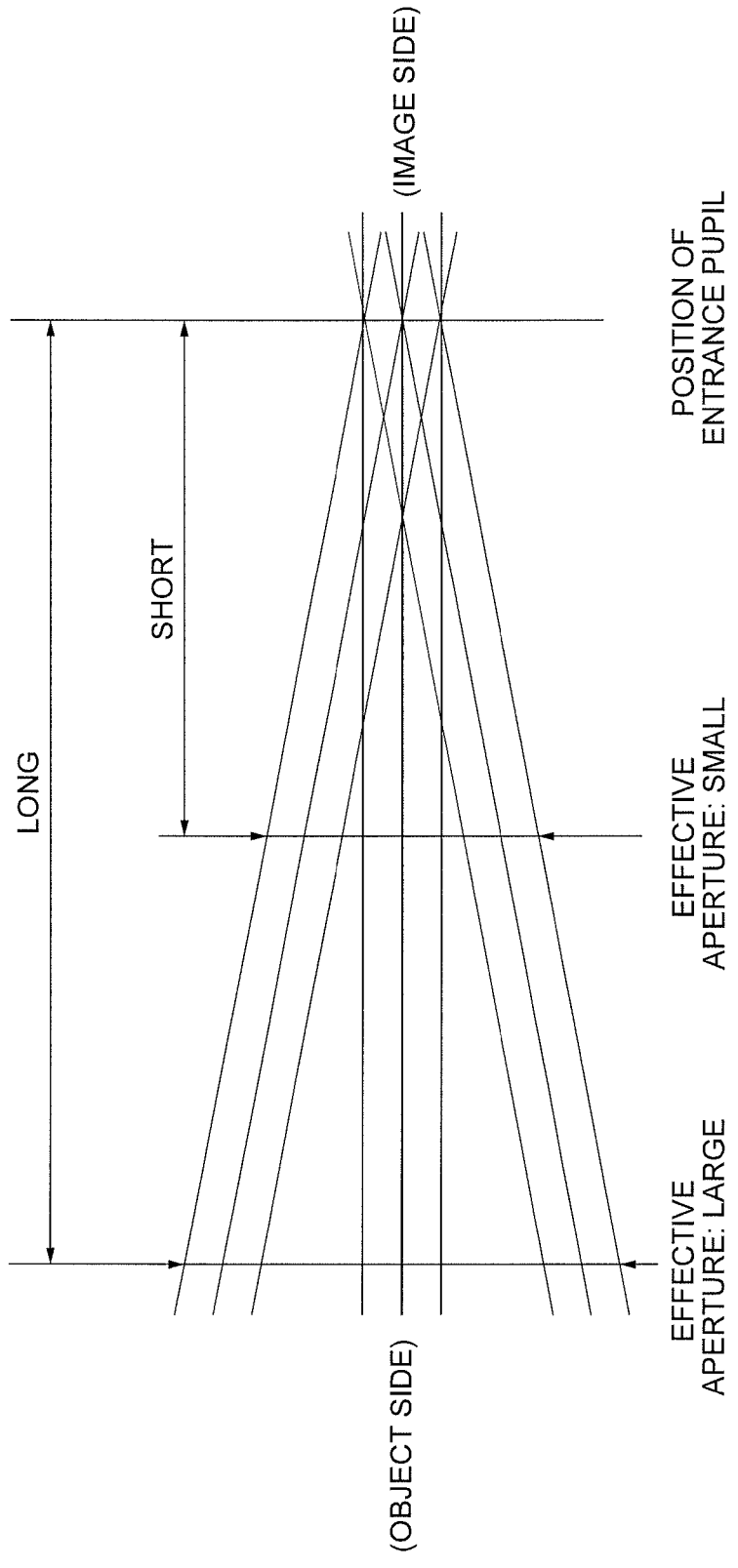
FIG. 19 is a diagram depicting a relationship of a position of the entrance pupil of the variable power optical system according to various embodiments of the present embodiment and the size of the effective aperture.
Figure 20:
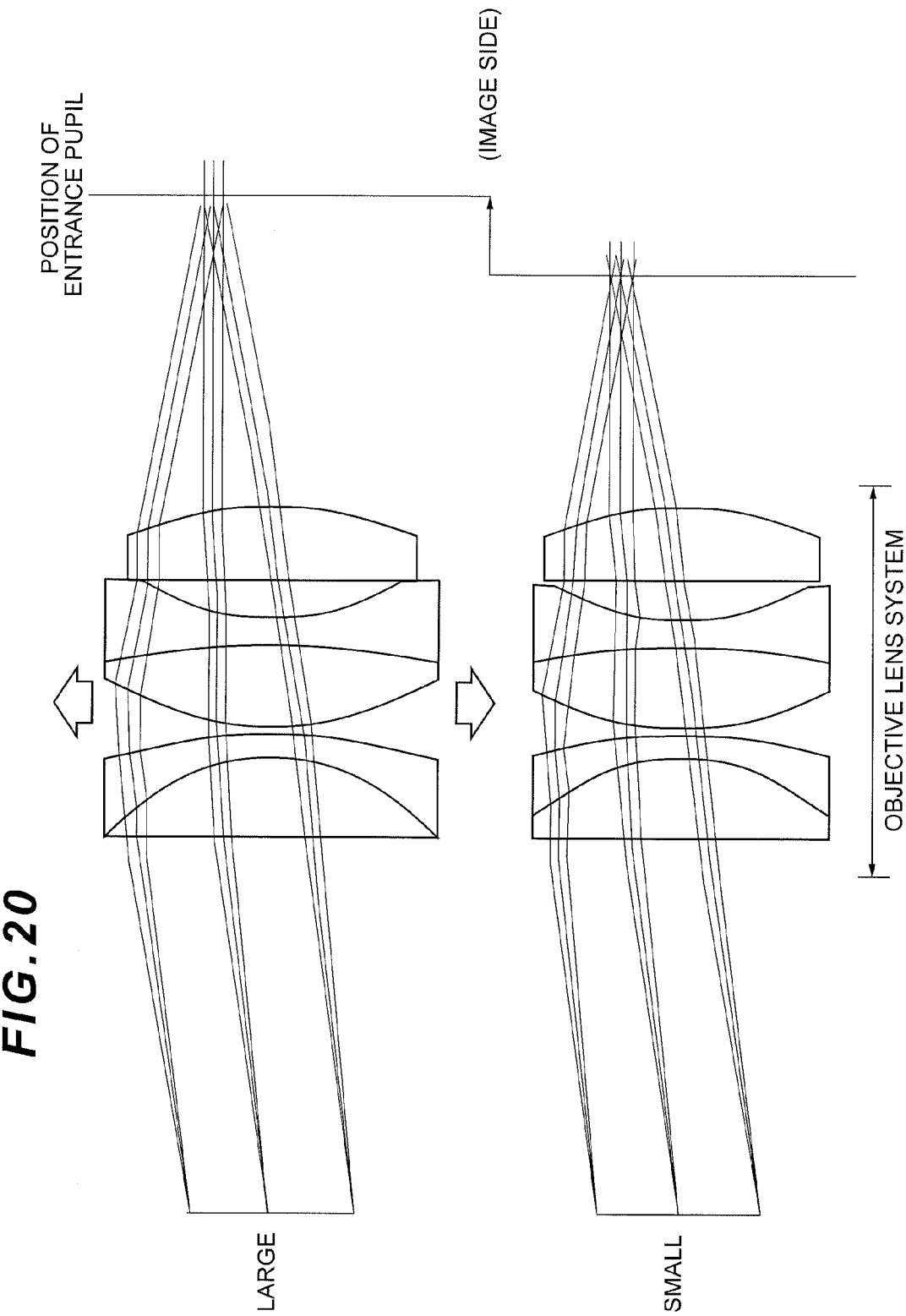
FIG. 20 is a diagram depicting a relationship of a position of the entrance pupil of the variable power optical system according to various embodiments of the present embodiment and the size of the objective optical system which is combined with the optical system.

In the case of the variable power optical system, an aperture stop is disposed approximately at the center of the optical system, as shown in FIG. 18, and an image of the aperture stop formed by the optical system disposed in the incident side (object side) of the aperture stop is called an entrance pupil. As FIG. 19 shows, a peripheral light quantity is lost unless the effective aperture of the lens closest to the object is increased more as the position of the entrance pupil is closer to the image, that is, as the distance from the vertex on the surface of the lens closest to the object in the variable power optical system to the position of the entrance pupil is longer. Furthermore, as FIG. 20 shows, the luminous flux at the outermost angle passes through an area closer to the outer edge of the objective optical system as the position of the entrance pupil is closer to the image, hence the objective optical system becomes huge, which makes it difficult for the user to handle, and difficult to correct aberrations.

As a consequence, the variable optical system of the present embodiment is constructed as described below, whereby the position of the entrance pupil of the optical system is moved closer to the object, so that the variable power range can be increased, and aberrations can be corrected well while improving the resolution (increasing the numerical aperture of the objective optical system).

Figure 1A:
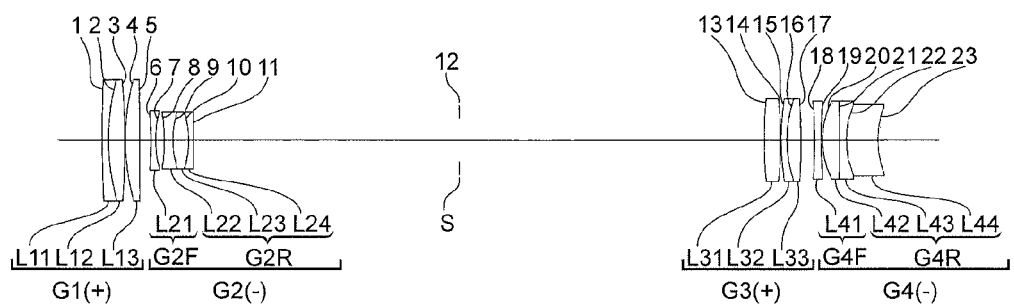
FIGS. 1A to 1C are cross-sectional views depicting a configuration of a variable power optical system according to Example 1, where
Figure 1B:
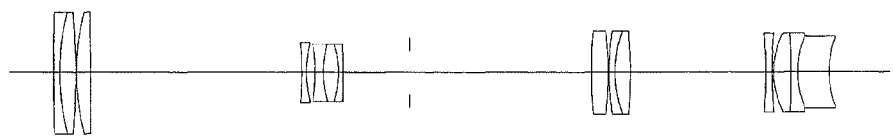
Figure 1C:
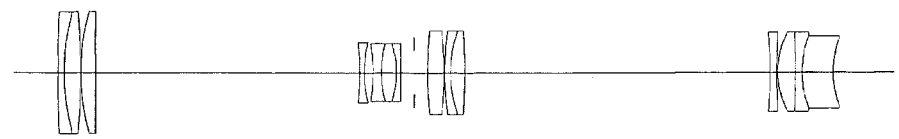

As FIGS. 1A to 1C show, the variable power optical system according to the present embodiment is used for a parallel system stereomicroscope, and has, in order from an object: a first lens group G1 having positive refractive power; a second lens group G2 having negative refractive power; an aperture stop S; a third lens group G3 having positive refractive power; and a fourth lens group G4 having negative refractive power, and the second lens group G2 further has, in order from the object, a front group G2F having negative refractive power; and a rear group G2R having an achromatic cemented lens including a positive lens and a negative lens. The second lens group G2 and the third lens group G3 move in opposite directions along the optical axis at least in a part of a variable power block.

In the above configuration, the following conditional expressions (1) and (2) are satisfied, where f2 denotes a focal length of the second lens group G2, and f2F denotes a focal length of a front group G2F constituting the second lens group G2, and q2 denotes a form factor of a negative lens L21 disposed closest to the object in the front group G2F constituting the second lens group G2 (the form factor q2 is defined by q2=(r22+r21)/(r22−R21) where r21 denotes a radius of curvature of the object side lens surface of the negative lens L21, and r22 denotes a radius of curvature of the image side lens surface of the negative lens L21).

$$0.4 < f2F/f2 < 1.6 \tag{1}$$

$$-3.0 < q2 < -0.3 \tag{2}$$

In order to move the position of the entrance pupil closer to the object, the space between the principal points of the first lens group G1 and the second lens group G2 of the variable power optical system in the lowest magnification state must be decreased, or the position of the aperture stop S must be moved closer to the object. If the position of the aperture stop S is moved closer to the object, however, it is difficult to increase a zoom ratio of the variable power optical system since the moving distance of the second lens group G2 becomes short. Therefore in the present variable power optical system having a high zoom ratio, an appropriate arrangement of refractive power in the second lens group G2 is specified by the conditional expression (1), so that the space between the principal points of the first lens group G1 and the second lens group G2 is decreased and the position of the entrance pupil is moved closer to the object.

If the upper limit value of a conditional expression (1) is exceeded, the object side principal point of the second lens group G2 moves to the image side, and the space between the first lens group G1 and the second lens group G2 cannot be secured when the variable power optical system is in the lowest magnification sate, which is not desirable. If the lower limit value of the conditional expression (1) is not reached, on the contrary, the object side principal point of the second lens group G2 moves to the object side, and the space between the second lens group G2 and the third lens group G3 (or the aperture stop S) cannot be secured when the variable power optical system is in the highest magnification state, which is not desirable. Furthermore, it becomes difficult to both correct the curvature of field on the low magnification side and correct the spherical aberration on the high magnification side, which is not desirable.

The conditional expression (2) specifies an optimum form of the negative lens L21 which is disposed closest to the object side in the front group G2F constituting the second lens group G2. If the upper limit value of the conditional expression (2) is exceeded, the object side lens surface r21 of the negative lens L21 disposed closest to the object in the front group G2F becomes small, and it becomes difficult to correct the curvature of field and coma aberration on the low magnification side, and the spherical aberration on the high magnification side, which is not desirable. If the lower limit value of the conditional expression (2) is not reached, on the other hand, the object side principal point of the second lens group G2 moves to the image side, and the space between the first lens group G1 and the second lens group G2 cannot be secured when the variable power optical system is in the lowest magnification state, which is not desirable.

In the present embodiment, it is preferable that the first lens group G1 include a negative lens disposed closest to the object, and the following conditional expression (3) be satisfied, where f1 denotes a focal length of the first lens group G1 and f2 denotes a focal length of the second lens group G2.

$$-0.3 < f2/f1 < -0.2 \tag{3}$$

The conditional expression (3) specifies a ratio of focal length between the first lens group G1 and the second lens group G2, which is optimum for this variable power optical system having a wide variable power range. If the upper limit value of the conditional expression (3) is exceeded, the refractive power of the third lens group G3 must be increased in order to increase the variable power range, and as a result, it becomes difficult to correct the spherical aberration and coma aberration in the low magnification side, which is not desirable. If the lower limit value of the conditional expression (3) is not reached, on the other hand, the refractive power of the second lens group G2 is increased, and it becomes difficult to correct the curvature of field on the low magnification side, and the spherical aberration on the high magnification side, which is not desirable. If the refractive power of the second lens group G2 is maintained in a range where the aberration correction is not affected, the total zoom length becomes too long, which is not desirable.

Lately fluorescent viewing using a stereomicroscope is becoming more important. This demand is particularly conspicuous in biology fields, such as embryology. Examples of the methods used to perform epi-illumination using a stereomicroscope are a method for illuminating an object via an illumination optical system and an objective optical system separately from a variable power optical system for viewing, a method for illuminating an object via a variable power optical system for viewing and an objective optical system, and a method for illuminating an object from outside an objective optical system.

In the case of the method for illuminating an object via an illumination optical system and an objective optical system separately from a variable power optical system for viewing, the excitation light for fluorescent illumination does not pass through the variable power optical system for viewing, hence self fluorescence is not generated within the variable power optical system for viewing, and a fluorescent image with good contrast can be viewed. Since an independent optical system is disposed for illumination, ultraviolet radiation of the excitation light can be handled more easily, compared with the method for illuminating an object via the variable power optical system for viewing and the objective optical system. In the case of this method, however, the illumination optical system is disposed separately from the variable power optical system for viewing, therefore compared with the method for illuminating an object via the variable power optical system for viewing and the objective optical system, the object side numerical aperture of the illumination light cannot be increased, and it is difficult to implement bright fluorescent illumination.

Therefore according to the variable power optical system of the present embodiment, a variable power optical system for viewing is used for fluorescent illumination in order to obtain bright fluorescent illumination, at the same time, in order to handle ultraviolet radiation of the excitation light, it is preferable that the positive lens (lens L23 in FIGS. 1A to 1C) constituting the cemented lens in the rear group G2R of the second lens group G2 satisfy the following conditional expressions (4) and (5), where T360 denotes an internal transmittance that does not include a reflection loss at wavelength 360 nm on the 10 mm thick optical material to be used, and nd denotes a refractive index at the d-line (wavelength: 587.56 nm), nC denotes a refractive index at C-line (wavelength: 656.27 nm), nF denotes a refractive index at F-line (wavelength: 486.13 nm), and vd2 denotes an Abbe number, of the optical material to be used respectively.

$$T360 \geq 0.5 \qquad (4)$$

$$vd2=(nd-1)/(nF-nC)<40 \qquad (5)$$

Normally, in order to correct the chromatic aberration of the negative lens group, a low dispersion glass material is mixed for the negative lens and a high dispersion glass material is mixed for the positive lens, but many high dispersion glass materials have low transmittance at the short wavelength side. In the present embodiment, the positive lens constituting the cemented lens in the rear group G2R of the second lens group G2 is formed of a high dispersion glass material, and also has strong refractive power (in order to provide strong refractive power to the second lens group G2), hence the positive lens is thick, which is a cause of dropping transmittance of the entire optical system in the ultraviolet region. The conditional expressions (4) and (5) specify conditions to improve transmittance of the variable power optical system in the ultraviolet region. Just like the conditional expressions (1) to (3), if the conditional expressions (4) and (5) are satisfied, chromatic aberration can be corrected well, and this variable power optical system can be used for fluorescent illumination which can handle ultraviolet radiation. If the conditional expression (4) is not satisfied, transmittance in the ultraviolet region drops, and this variable power optical system cannot be used for the fluorescent illumination which can handle ultraviolet radiation, which is not desirable. If the conditional expression (5) is not satisfied, it becomes difficult to correct chromatic aberration well, which is not desirable.

In order to implement even better performance and specifications, it is preferable to satisfy the following conditions.

In the present embodiment, it is preferable that the fourth lens group G4 have, in order from the object, a front group G4F having a negative refractive power, and a rear group G4R including a cemented lens having a convex surface facing the object, and the cemented lens of the rear group G4R include a positive lens (lens L42 in FIGS. 1A to 1C) disposed closest to the object, and the following conditional expression (6) be satisfied, where q2 denotes a form factor of the positive lens disposed closest to the object in the rear group G4R constituting the fourth lens group G4 (the form factor q4 is defined by q4=(r42+r41)/(R42−R41) where r41 denotes a radius of curvature of the object side lens surface of the positive lens, and r42 denotes a radius of curvature of the image side lens surface of the positive lens).

$$|q4| \geq 1 \qquad (6)$$

In the present embodiment, if the variable power range extends to the low magnification side, a lower coma of the abaxial light is refracted considerably in the second lens group G2 and the third lens group G3 during the lowest magnification, and major coma aberration is generated. To correct this coma aberration, the form of the lens closest to the object in the cemented lens constituting the rear group G4R of the fourth lens group G4 satisfies the conditional expression (6). If the range given by conditional expression (6) is not satisfied, coma aberration on the low magnification side cannot be corrected sufficiently.

In the present embodiment, it is preferable that the positive lens (lens L23 in FIGS. 1A to 1C) in the rear group G2R of the second lens group G2 satisfy the following conditional expression (7), where ng denotes a refractive index at g-line (wavelength: 435.83 nm) of an optical material to be used, and PgF2 denotes a partial dispersion ratio.

$$PgF2=(ng-nF)/(nF-nC)>0.57 \qquad (7)$$

The conditional expression (7) specifies the condition to correct a longitudinal chromatic aberration in this variable power optical system. If the conditional expression (7) is satisfied, the longitudinal chromatic aberration at g-line to C-line can be corrected well, particularly in the high magnification range. If the range of the conditional expression (7) is not satisfied, on the other hand, aberration correction at g-line becomes difficult when the longitudinal chromatic aberration is corrected at F-line to C-line.

In the present embodiment, it is preferable that the positive lens (lens L42 in FIGS. 1A to 1C) closest to the object in the rear group G4R of the fourth lens group G4 satisfy the following conditional expressions (8) and (9), where vd4 denotes an Abbe number of an optical material to be used, and nd4 denotes a refractive index at d-line.

$$vd4=(nd-1)/(nF-nC)<45 \tag{8}$$

$$nd4<1.75 \tag{9}$$

The conditional expressions (8) and (9) specify the conditions to correct a lateral chromatic aberration on the low magnification side in this variable power optical system. If the conditional expressions (8) and (9) are satisfied, the lateral chromatic aberration at g-line to C-line can be corrected well, particularly in the low magnification range. If the range of the conditional expressions (8) and (9) are not satisfied, on the other hand, aberration correction at g-line becomes difficult when the lateral chromatic aberration is corrected at F-line to C-line.

EXAMPLES

Examples of the present embodiment will now be described with reference to the drawings. Table 1 to Table 6 shown below are tables listing each data in Example 1 to Example 6. In [General Data], f is a composite focal length of this variable power optical system and an image optical system which is used in combination (when d0=∞), and FNO is an F number. In [Lens Data], the surface number shows a sequence of the lens surface counted from the object side along the ray traveling direction, r is a radius of curvature of each lens surface, d is a distance on the optical axis from each optical surface to the next optical surface (or an image plane), vd is an Abbe number, and nd is a refractive index at d-line (wavelength: 587.6 nm). The radius of curvature "0.0000" indicates a plane or an aperture. The refractive index of air "1.000000" is omitted. In [Variable Distance Data], f is a composite focal length of this variable optical system, and the image optical system is used in combination, and di (i is an integer) is a variable surface distance of the i-th surface. In [Conditional expression correspondence value], values corresponding to the conditional expressions (1) to (9) (conditional expressions (1) to (5) in the case of Example 5 and Example 6) are shown.

In the tables, "mm" is normally used for the unit of focal length f, radius of curvature r, surface distance d and other lengths. However the unit is not limited to "mm", but another appropriate unit may be used instead, since an equivalent optical performance is obtained even if an optical system is proportionally expanded or proportionally reduced.

The above description on the tables is the same for the other examples, for which this description is omitted.

Example 1

Example 1 will now be described with reference to FIGS. 1A to 1C, FIGS. 2A to 2C and Table 1. FIGS. 1A to 1C are diagrams depicting the lens according to Example 1, where FIG. 1A shows a lowest magnification state (f=50.4000), FIG. 1B shows an intermediate magnification state (f=320.0000), and FIG. 1C shows a highest magnification state (f=1260.0000). As FIGS. 1A to 1C show, the variable power optical system according to Example 1 has, in order from the object, a first lens group G1 having positive refractive power, a second lens group G2 having negative refractive power, an aperture stoop S, a third lens group G3 having positive refractive power, and a fourth lens group G4 having negative refractive power.

The first lens group G1 has, in order from the object, a cemented lens of a negative meniscus lens L11 having a convex surface facing the object and a biconvex lens L12, and a planoconvex lens L13 having a convex surface facing the object. The second lens group G2 has, in order from the object, a front group G2F which includes a biconcave lens L21, and has a negative refractive power, and a rear group G2R which includes an achromatic cemented lens of a biconcave lens L22, a biconvex lens L23 and a planoconcave lens L24 having a concave surface facing the object. The third lens group G3 has, in order from the object, a biconvex lens L31, and a cemented lens of a negative meniscus lens L32 having a convex surface facing the object and a biconvex lens L33. The fourth lens group G4 has, in order from the object, a front group G4F which includes a biconcave lens L41 and has negative refractive power, and a rear group G4R which includes a cemented lens of a biconvex lens L42, a biconcave lens L43, and a positive meniscus lens L44 having a convex surface facing the object.

In the variable power optical system according to this example having the above configuration, upon zooming from the lowest magnification state to the highest magnification state, the first lens group G1 and the fourth lens group G4 are fixed, the second lens group G2 is moved to the image side and the third lens group G3 is moved to the object side.

Table 1 below shows each data of the variable power optical system according to Example 1. The surface members 1 to 23 in Table 1 correspond to the surfaces 1 to 23 in FIGS. 1A to 1C.

TABLE 1

| [General Data] | | | |
|---|---|---|---|
| | Lowest magnification state | Intermediate magnification state | Highest magnification state |
| f | 50.4000~ | 320.0000~ | 126.0000 |
| FNO | 16.61~ | 23.73~ | 50.06 |

| [Lens Data] | | | | |
|---|---|---|---|---|
| Surface number | r | d | vd | nd |
| | | d0 | | |
| 1 | 287.5600 | 1.4000 | 42.72 | 1.834810 |
| 2 | 51.3030 | 3.5000 | 82.56 | 1.497820 |
| 3 | −170.2215 | 0.1500 | | |
| 4 | 49.6124 | 3.1000 | 68.33 | 1.592400 |
| 5 | 0.0000 | d5 | | |
| 6 | −89.0973 | 1.0000 | 35.71 | 1.902650 |
| 7 | 24.8006 | 1.9000 | | |
| 8 | −37.0305 | 1.8000 | 82.56 | 1.497820 |
| 9 | 22.2208 | 3.3000 | 32.27 | 1.738000 |
| 10 | −22.2208 | 1.0000 | 54.68 | 1.729157 |
| 11 | 0.0000 | d11 | | |
| 12 | 0.0000 | d12 | (Aperture stop S) | |
| 13 | 84.9551 | 3.6000 | 82.56 | 1.497820 |
| 14 | −84.9551 | 0.1500 | | |
| 15 | 56.4259 | 1.3000 | 34.71 | 1.720467 |
| 16 | 26.5640 | 3.1000 | 82.56 | 1.497820 |
| 17 | −143.7045 | d17 | | |
| 18 | −105.2698 | 1.4000 | 82.56 | 1.497820 |
| 19 | 105.2698 | 0.3000 | | |
| 20 | 18.7056 | 3.7000 | 35.30 | 1.592700 |
| 21 | −204.5470 | 1.4000 | 42.72 | 1.834810 |

TABLE 1-continued

| 22 | 19.6043 | 7.0000 | 70.45 | 1.487490 |
| 23 | 19.5959 | 7.0000 | | |

[Variable Distance Data]

| | Lowest magnification state | Intermediate magnification state | Highest magnification state |
|---|---|---|---|
| f | 50.4000 | 320.0000 | 1260.0000 |
| d0 | 0.0000 | 0.0000 | 0.0000 |
| d5 | 2.4981 | 45.3527 | 57.1127 |
| d11 | 57.5693 | 14.7147 | 2.9547 |
| d12 | 66.3140 | 39.6074 | 2.9856 |
| d17 | 2.9990 | 29.7057 | 66.3274 |

[Conditional expression correspondence value]

| Conditional expression (1) | f2F/f2 = 1.034 |
| Conditional expression (2) | q2 = −0.565 |
| Conditional expression (3) | f2/f1 = −0.234 |
| Conditional expression (4) | T360 = 0.74 |
| Conditional expression (5) | vd2 = 32.3 |
| Conditional expression (6) | |q4| = 43.02 |
| Conditional expression (7) | PgF2 = 0.5899 |
| Conditional expression (8) | vd4 = 35.3 |
| Conditional expression (9) | nd4 = 1.5927 |

As the data in Table 1 shows, all the conditional expressions (1) to (9) are satisfied in the variable power optical system according to Example 1.

Figure 2B:
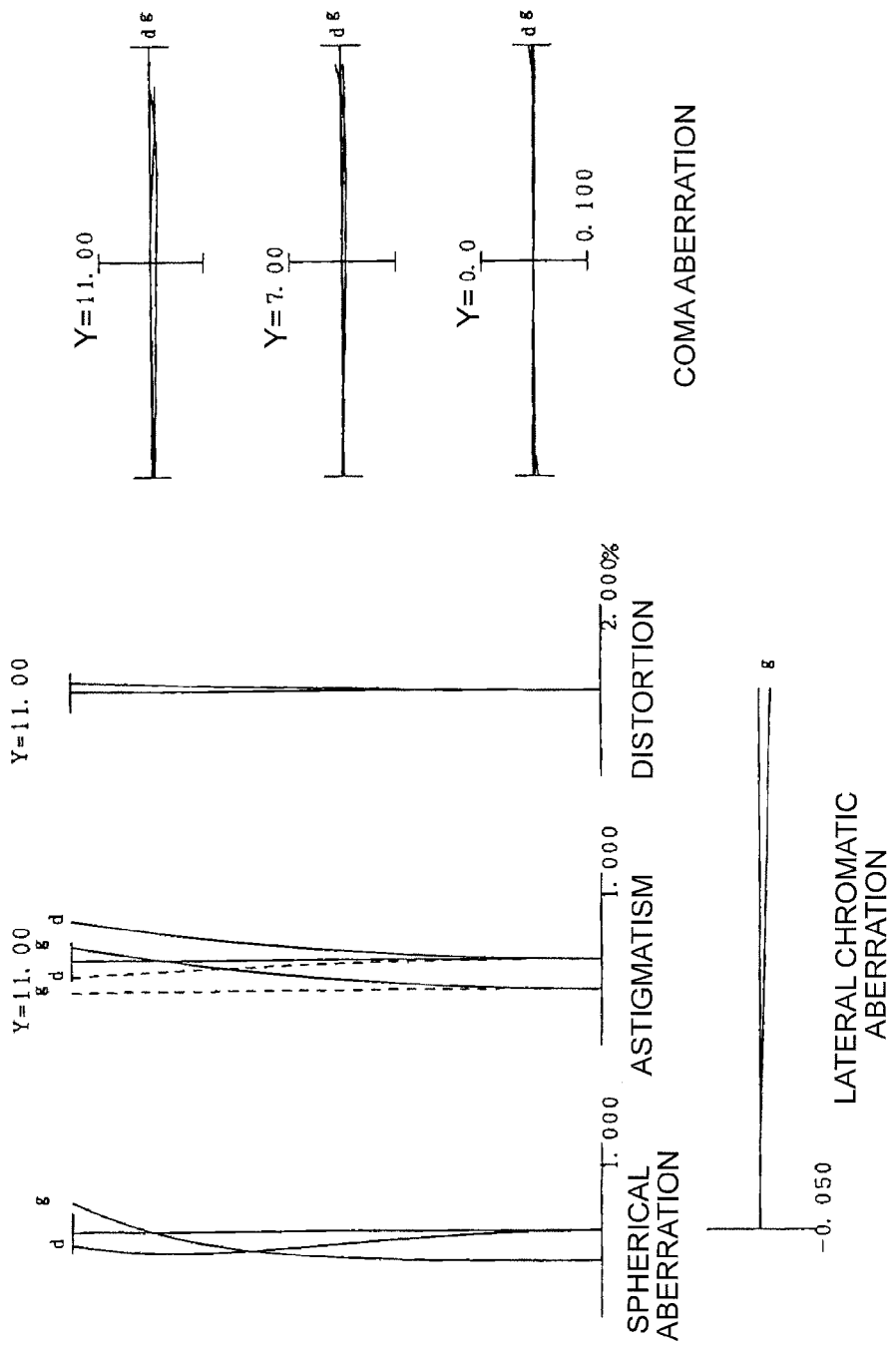
Figure 2C:
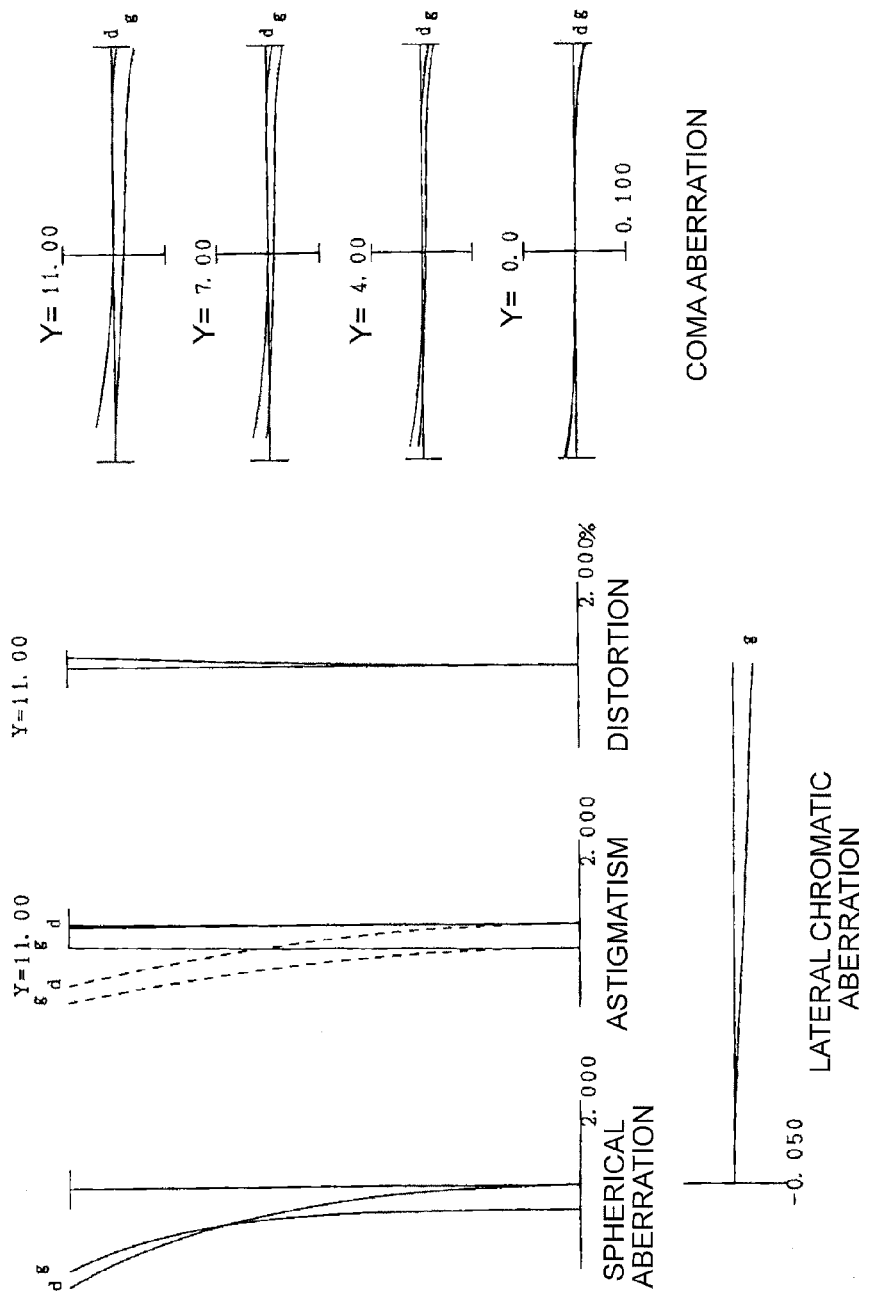

FIGS. 2A to 2C are graphs showing various aberrations of the variable power optical system according to Example 1, where FIG. 2A shows a lowest magnification state (f=50.4000), FIG. 2B shows an intermediate magnification state (f=320.000), and FIG. 2C shows a highest magnification state (f=1260.0000). In each graph showing Aberrations, Y denotes an image height (unit: mm). In the graph showing the spherical aberration, a value of an F number corresponding to the maximum aperture is shown, in the graph showing astigmatism and the graph showing distortion, the maximum value of the image height is shown respectively, and in the graph showing coma aberration, a value of each image height is shown. d shows various aberrations at d-line, g shows various aberrations at g-line, and no indication shows various aberrations at d-line. In the graph showing astigmatism, the solid line indicates the sagittal image surface, and the broken line indicates the meridional image surface. The above description on the graphs showing aberrations is the same for the other examples, for which this description is omitted.

As seen in each graph showing aberrations, in Example 1, various aberrations are corrected well in each magnification state from the highest magnification state to the lowest magnification state, indicating that this variable power optical system has a superb optical performance.

Example 2

Figure 3A:
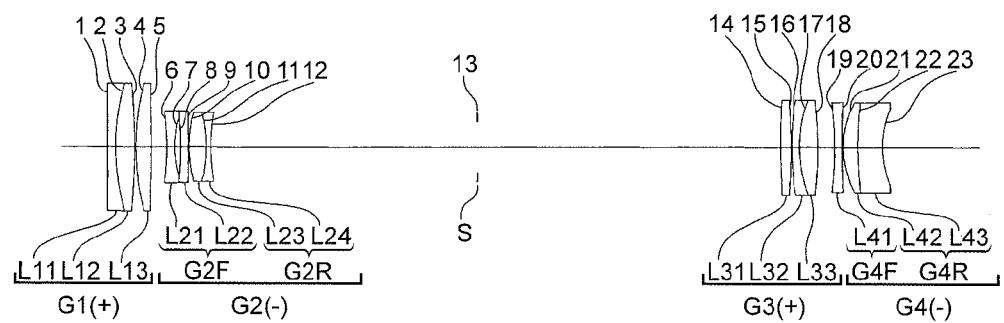
FIGS. 3A to 3C are cross-sectional views depicting a configuration of a variable power optical system according to Example 2, where
Figure 3B:
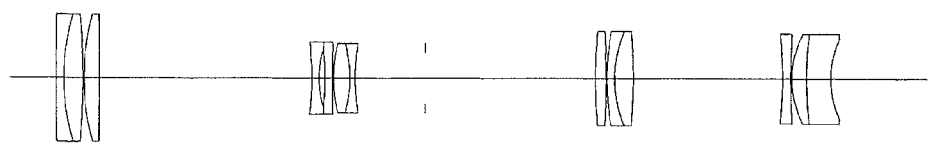
Figure 3C:
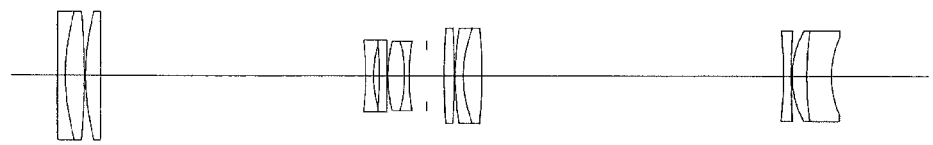

Example 2 will now be described with reference to FIGS. 3A to 3C, FIGS. 4A to 4C and Table 2. FIGS. 3A to 3C are diagrams depicting the lens according to Example 2, where FIG. 3A shows a lowest magnification state (f=56.0000), FIG. 3B shows an intermediate magnification state (f=320.0000), and FIG. 3C shows a highest magnification state (f=1008.0000). As FIGS. 3A to 3C show, the variable power optical system according to Example 2 has, in order from the object, a first lens group G1 having positive refractive power, a second lens group G2 having negative refractive power, an aperture stoop S, a third lens group G3 having positive refractive power, and a fourth lens group G4 having negative refractive power.

The first lens group G1 has, in order from the object, a cemented lens of a negative meniscus lens L11 having a convex surface facing the object and a biconvex lens L12, and a biconvex lens L13. The second lens group G2 has, in order from the object, a front group G2F which includes a biconcave lens L21 and a planoconcave lens L22 having a concave surface facing the object, and has a negative refractive power, and a rear group G2R which includes an achromatic cemented lens of a biconvex lens L23 and a biconcave lens L24. The third lens group G3 has, in order from the object, a biconvex lens L31, and a cemented lens of a negative meniscus lens L32 having a convex surface facing the object and a biconvex lens L33. The fourth lens group G4 has, in order from the object, a front group G4F which includes a biconcave lens L41 and has negative refractive power, and a rear group G4R which includes a cemented lens of a positive meniscus lens L42 having a convex surface facing the object and a negative meniscus lens L43 having a convex surface facing the object.

In the variable power optical system according to this example having the above configuration, upon zooming from the lowest magnification state to the highest magnification state, the first lens group G1 and the fourth lens group G4 are fixed, the second lens group G2 is moved to the image side and the third lens group G3 is moved to the object side.

Table 2 shows each data of the variable power optical system according to Example 2. The surface members 1 to 23 in Table 2 correspond to the surfaces 1 to 23 in FIGS. 3A to 3C.

TABLE 2

[General Data]

| | Lowest magnification state | Intermediate magnification state | Highest magnification state |
|---|---|---|---|
| f | 56.0000~ | 320.0000~ | 1260.0000 |
| FNO | 15.25~ | 22.29~ | 42.13 |

[Lens Data]

| Surface number | r | d | vd | nd |
|---|---|---|---|---|
| | | d0 | | |
| 1 | 1096.3408 | 1.5000 | 44.79 | 1.744000 |
| 2 | 44.9980 | 3.7000 | 71.31 | 1.569070 |
| 3 | −140.5120 | 0.2000 | | |
| 4 | 46.8130 | 3.0000 | 82.56 | 1.497820 |
| 5 | −5381.3812 | d5 | | |
| 6 | −53.7185 | 1.5000 | 46.58 | 1.804000 |
| 7 | 21.8338 | 1.1000 | | |
| 8 | −61.5539 | 1.5000 | 46.58 | 1.804000 |
| 9 | 0.0000 | 0.2000 | | |
| 10 | 26.4090 | 3.2000 | 32.27 | 1.738000 |
| 11 | −26.4090 | 1.0000 | 68.33 | 1.592400 |
| 12 | 39.7526 | d12 | | |
| 13 | 0.0000 | d13 | (Aperture stop S) | |
| 14 | 117.6950 | 2.0000 | 71.31 | 1.569070 |
| 15 | −176.2328 | 0.2000 | | |
| 16 | 55.9680 | 1.5000 | 32.27 | 1.738000 |
| 17 | 24.9950 | 3.6000 | 71.31 | 1.569070 |
| 18 | −96.3689 | d18 | | |
| 19 | −79.4787 | 1.5000 | 65.44 | 1.603001 |
| 20 | 161.8346 | 0.2000 | | |
| 21 | 19.3029 | 2.8000 | 35.30 | 1.592700 |
| 22 | 71.5140 | 4.7000 | 46.58 | 1.804000 |
| 23 | 18.5019 | 7.0000 | | |

TABLE 2-continued

[Variable Distance Data]

|  | Lowest magnification state | Intermediate magnification state | Highest magnification state |
|---|---|---|---|
| f | 56.0000 | 320.0000 | 1008.0000 |
| d0 | 0.0000 | 0.0000 | 0.0000 |
| d5 | 3.0603 | 41.1620 | 51.5094 |
| d12 | 51.8376 | 13.7359 | 3.3885 |
| d13 | 59.1889 | 33.3335 | 3.3893 |
| d18 | 3.1509 | 29.0064 | 58.9505 |

[Conditional expression correspondence value]

| Conditional expression (1) | f2F/f2 = 0.694 |
| Conditional expression (2) | q2 = −0.422 |
| Conditional expression (3) | f2/f1 = −0.254 |
| Conditional expression (4) | T360 = 0.74 |
| Conditional expression (5) | vd2 = 32.3 |
| Conditional expression (6) | |q4| = 47.20 |
| Conditional expression (7) | PgF2 = 0.5899 |
| Conditional expression (8) | vd4 = 35.3 |
| Conditional expression (9) | nd4 = 1.5927 |

As the data in Table 2 shows, all the conditional expressions (1) to (9) are satisfied in the variable power optical system according to Example 2.

Figure 4A:
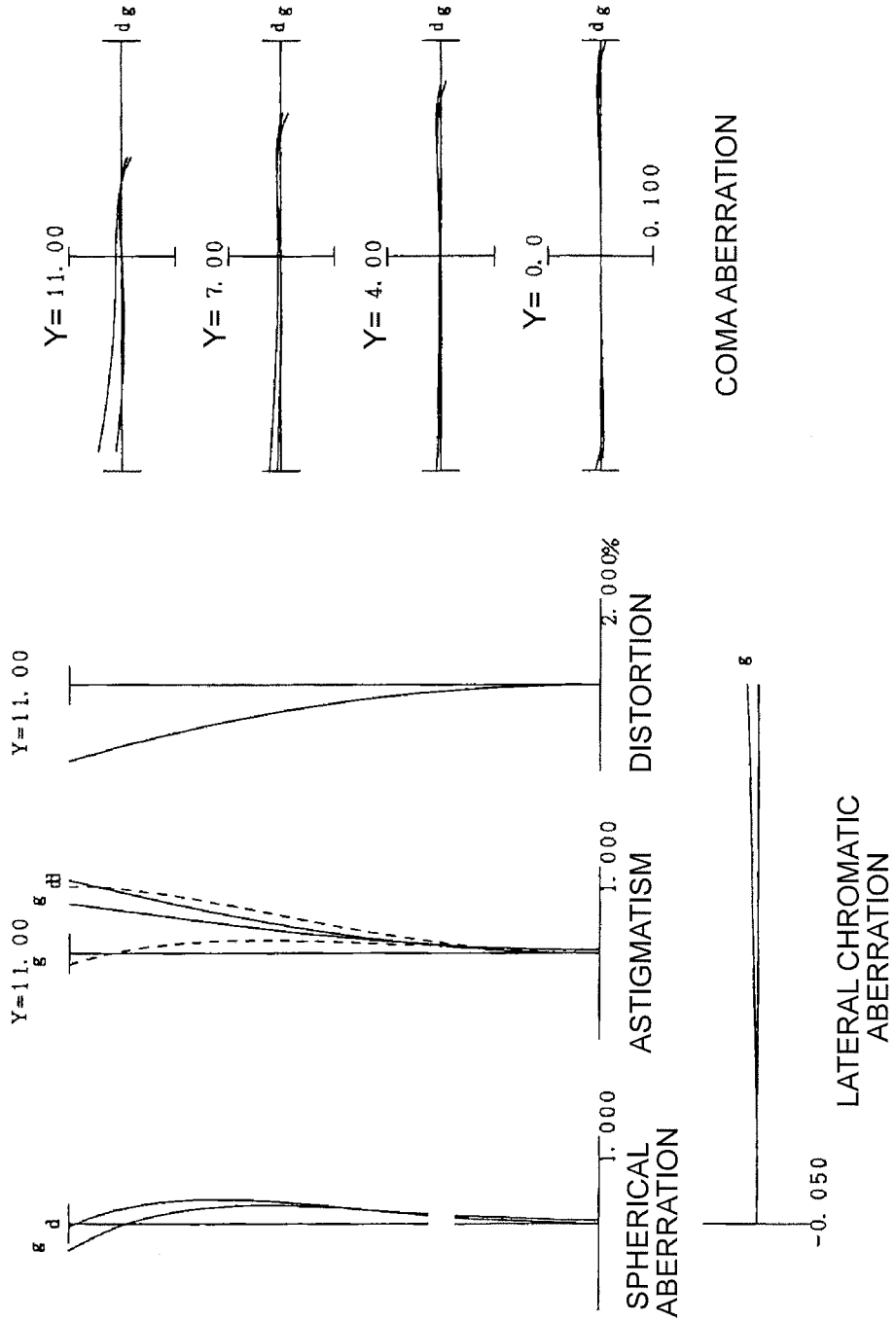
FIGS. 4A to 4C are graphs showing various aberrations of the variable power optical system according to Example 2, where
Figure 4B:
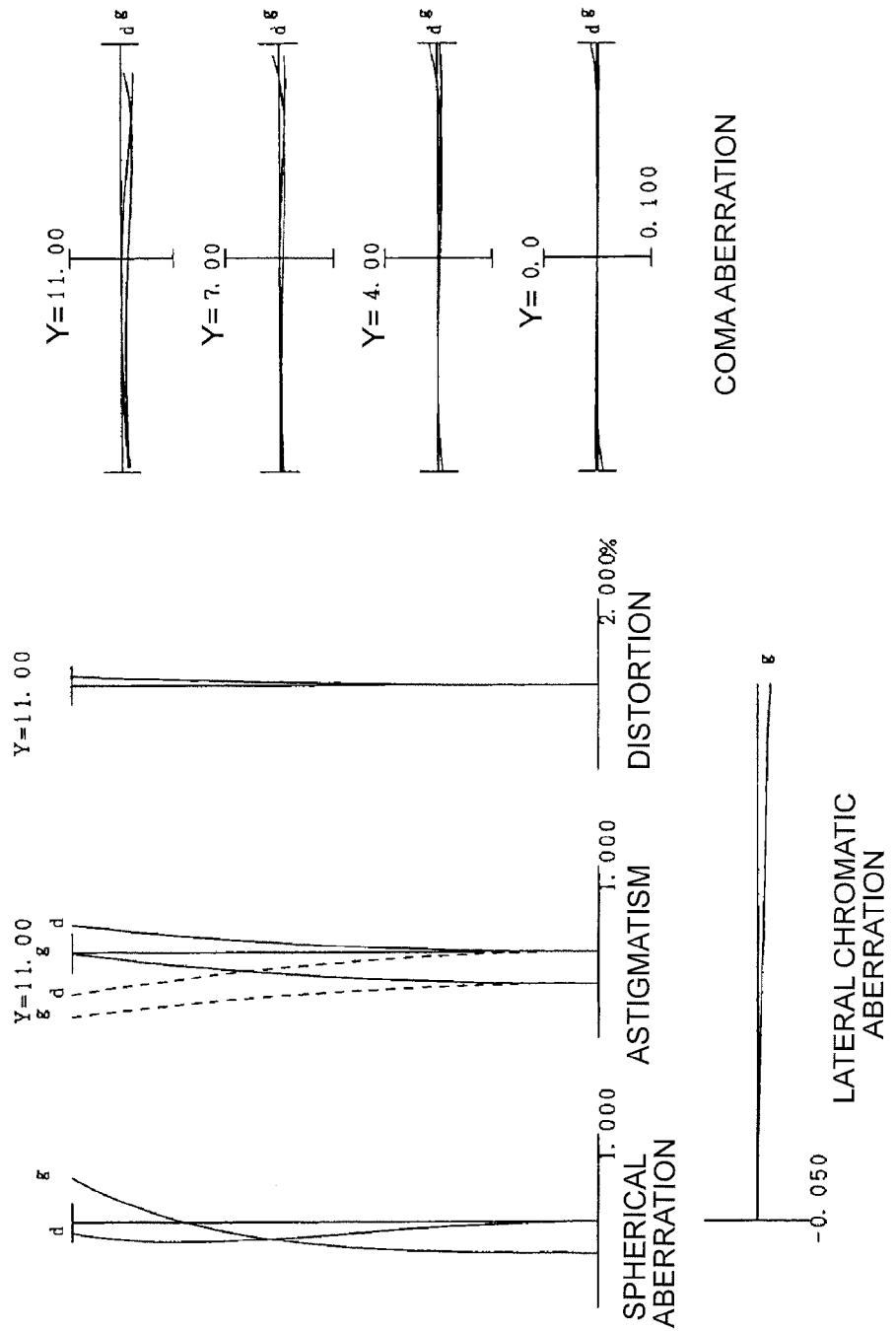
Figure 4C:
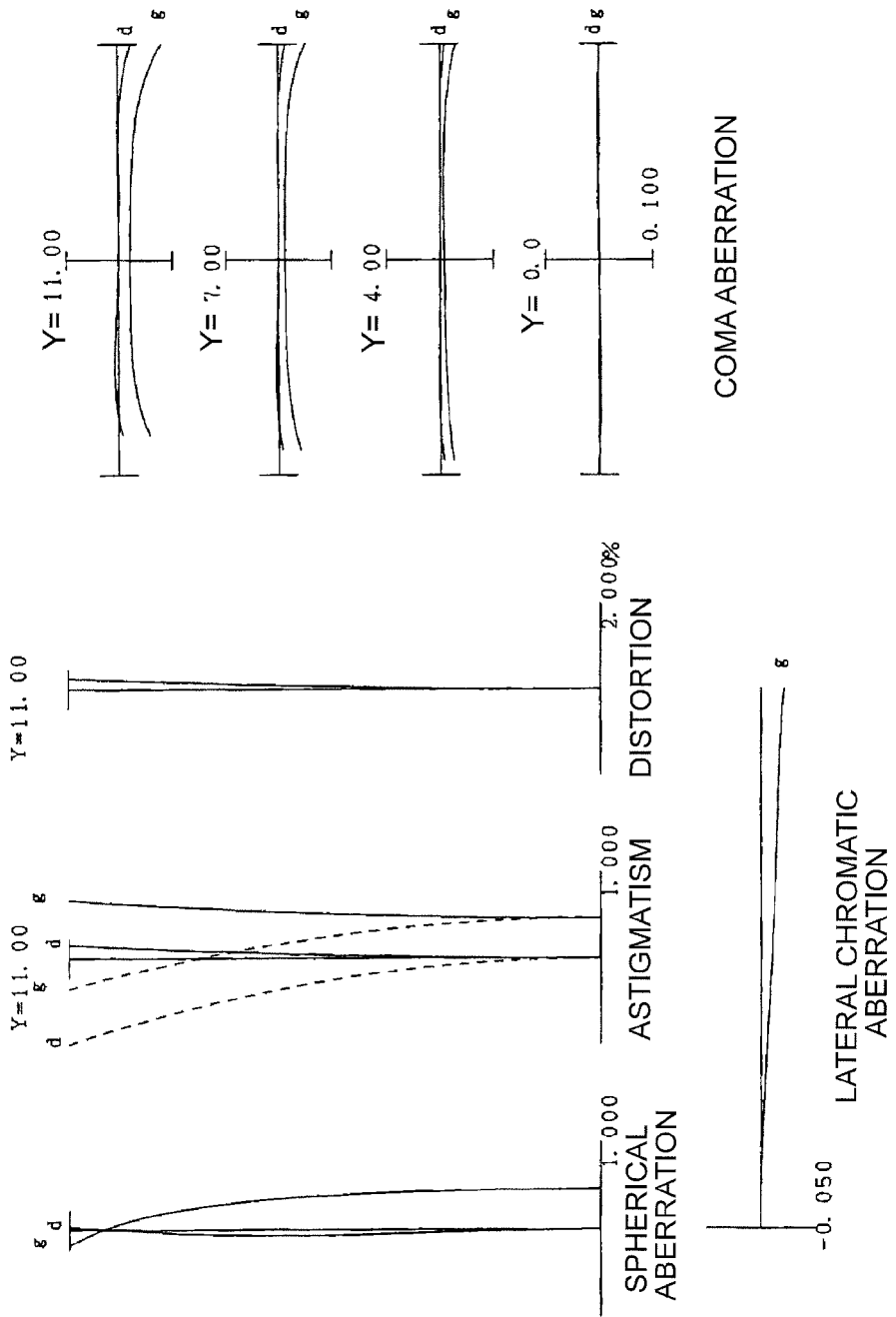

FIGS. 4A to 4C are graphs showing various aberrations of the variable power optical system according to Example 2, where FIG. 4A shows a lowest magnification state (f=56.0000), FIG. 4B shows an intermediate magnification state (f=320.0000), and FIG. 4C shows a highest magnification state (f=1008.0000). As seen in each graph showing aberrations, in Example 2, various aberrations are corrected well in each magnification state from the highest magnification state to the lowest magnification state, indicating that this variable power optical system has a superb optical performance.

Example 3

Figure 5A:
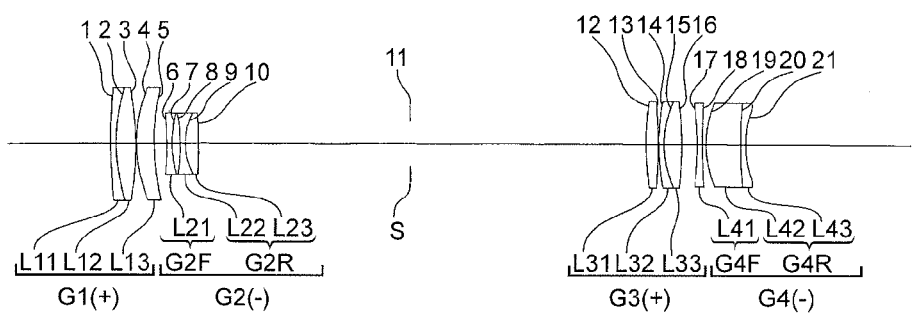
FIGS. 5A to 5C are cross-sectional views depicting a configuration of a variable power optical system according to Example 3, where
Figure 5B:
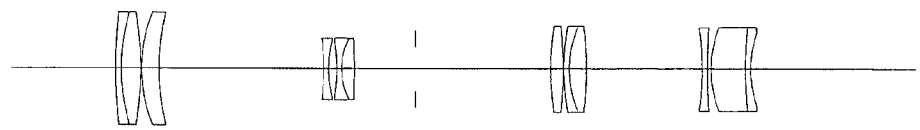
Figure 5C:
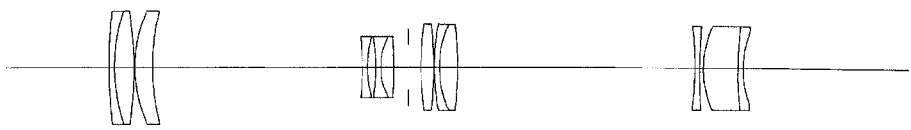

Example 3 will now be described with reference to FIGS. 5A to 5C, FIGS. 6A to 6C and Table 3. FIGS. 5A to 5C are diagrams depicting the lens according to Example 3, where FIG. 5A shows a lowest magnification state (f=63.0000), FIG. 5B shows an intermediate magnification state (f=320.0000), and FIG. 5C shows a highest magnification state (f=1000.0000). As FIGS. 5A to 5C show, the variable power optical system according to Example 3 has, in order from the object, a first lens group G1 having positive refractive power, a second lens group G2 having negative refractive power, an aperture stoop S, a third lens group G3 having positive refractive power, and a fourth lens group G4 having negative refractive power.

The first lens group G1 has, in order from the object, a cemented lens of a negative meniscus lens L11 having a convex surface facing the object and a biconvex lens L12, and a positive meniscus lens L13 having a convex surface facing the object. The second lens group G2 has, in order from the object, a front group G2F which includes a biconcave lens L21, and has a negative refractive power, and a rear group G2R which includes an achromatic cemented lens of a biconcave lens L22 and a biconvex lens L23. The third lens group G3 has, in order from the object, a biconvex lens L31, and a cemented lens of a negative meniscus lens L32 having a convex surface facing the object and a biconvex lens L33. The fourth lens group G4 has, in order from the object, a front group G4F which includes a biconcave lens L41 and has negative refractive power, and a rear group G4R which includes a cemented lens of a positive meniscus lens L42 having a convex surface facing the object and a negative meniscus lens L43 having a convex surface facing the object.

In the variable power optical system according to this example having the above configuration, upon zooming from the lowest magnification state to the highest magnification state, the first lens group G1 and the fourth lens group G4 are fixed, the second lens group G2 is moved to the image side and the third lens group G3 is moved to the object side.

Table 3 shows each data of the variable power optical system according to Example 3. The surface members 1 to 21 in Table 3 correspond to the surfaces 1 to 21 in FIGS. 5A to 5C.

TABLE 3

[General Data]

|  | Lowest magnification state | Intermediate magnification state | Highest magnification state |
|---|---|---|---|
| f | 63.0000~ | 320.0000~ | 1000.0000 |
| FNO | 17.74~ | 25.57~ | 47.28 |

[Lens Data]

| Surface number | r | d | vd | nd |
|---|---|---|---|---|
|  |  | d0 |  |  |
| 1 | 103.3187 | 1.0000 | 42.72 | 1.834810 |
| 2 | 35.8739 | 3.8100 | 82.56 | 1.497820 |
| 3 | −71.1085 | 0.1500 |  |  |
| 4 | 28.0389 | 3.5040 | 69.89 | 1.518600 |
| 5 | 46.4803 | d5 |  |  |
| 6 | −51.7687 | 1.0000 | 49.61 | 1.772500 |
| 7 | 22.6357 | 1.5889 |  |  |
| 8 | −36.4262 | 1.0000 | 57.36 | 1.670000 |
| 9 | 12.7421 | 2.5048 | 32.27 | 1.738000 |
| 10 | −102.6546 | d10 |  |  |
| 11 | 0.0000 | d11 | (Aperture stop S) |  |
| 12 | 54.9136 | 2.4318 | 64.12 | 1.516800 |
| 13 | −92.0011 | 0.1500 |  |  |
| 14 | 47.4764 | 1.0000 | 35.33 | 1.749505 |
| 15 | 20.6148 | 3.4738 | 82.56 | 1.497820 |
| 16 | −74.8541 | d16 |  |  |
| 17 | −62.8410 | 1.0000 | 51.51 | 1.734000 |
| 18 | 133.5080 | 0.6950 |  |  |
| 19 | 21.1808 | 6.8052 | 30.13 | 1.698950 |
| 20 | 75.2274 | 1.0000 | 42.72 | 1.834810 |
| 21 | 19.8119 | 7.0000 |  |  |

[Variable Distance Data]

|  | Lowest magnification state | Intermediate magnification state | Highest magnification state |
|---|---|---|---|
| f | 63.0000 | 320.0000 | 1000.0000 |
| d0 | 0.0000 | 0.0000 | 0.0000 |
| d5 | 2.5379 | 32.1031 | 41.0906 |
| d10 | 41.4895 | 11.9243 | 2.9368 |
| d11 | 45.8266 | 26.2442 | 2.5168 |
| d16 | 2.9876 | 22.5700 | 46.2974 |

[Conditional expression correspondence value]

| Conditional expression (1) | f2F/f2 = 1.105 |
| Conditional expression (2) | q2 = −0.392 |
| Conditional expression (3) | f2/f1 = −0.251 |
| Conditional expression (4) | T360 = 0.74 |
| Conditional expression (5) | vd2 = 32.3 |
| Conditional expression (6) | |q4| = 29.95 |
| Conditional expression (7) | PgF2 = 0.5899 |
| Conditional expression (8) | vd4 = 30.13 |
| Conditional expression (9) | nd4 = 1.69895 |

As the data in Table 3 shows, all the conditional expressions (1) to (9) are satisfied in the variable power optical system according to Example 3.

Figure 6B:
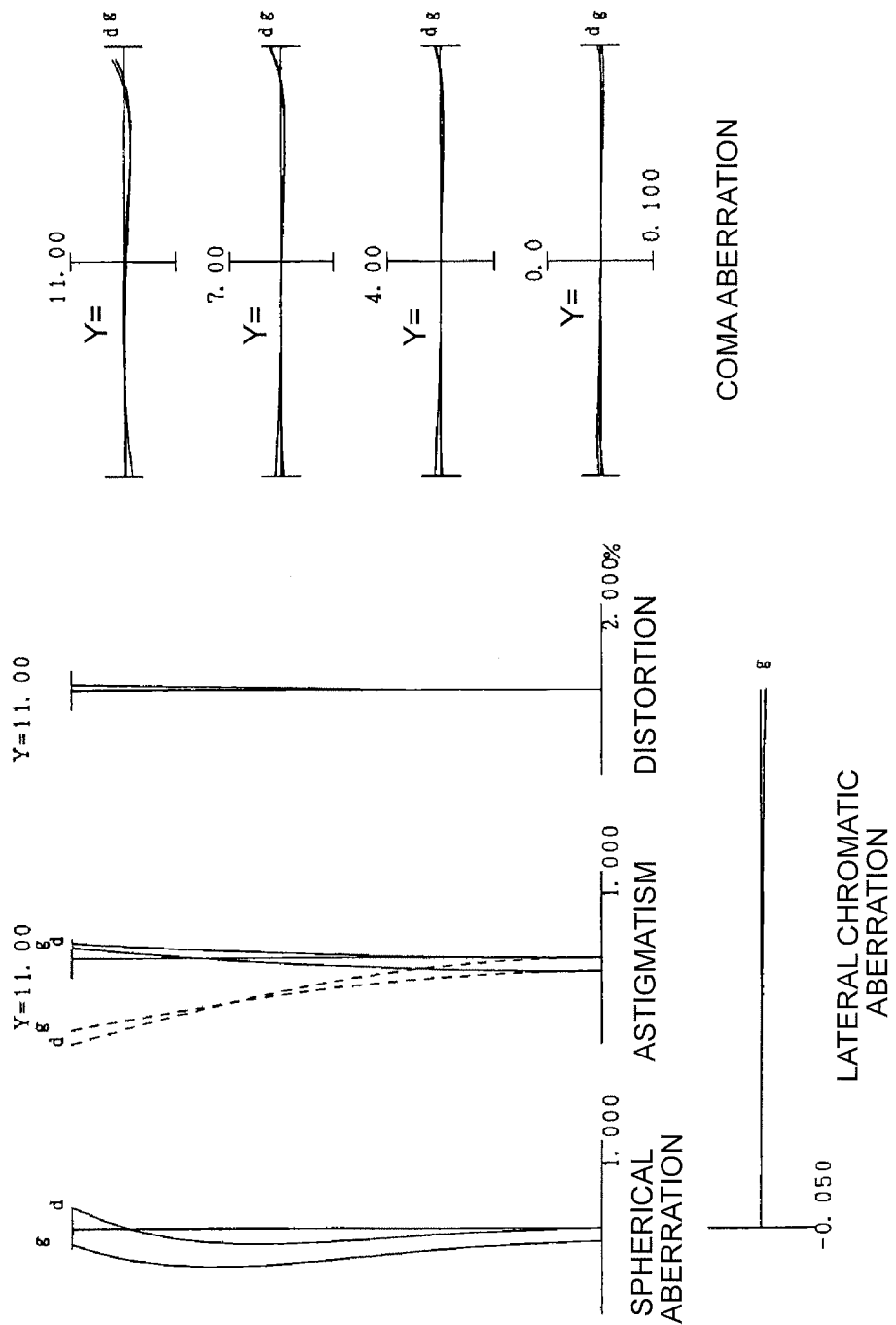
Figure 6C:
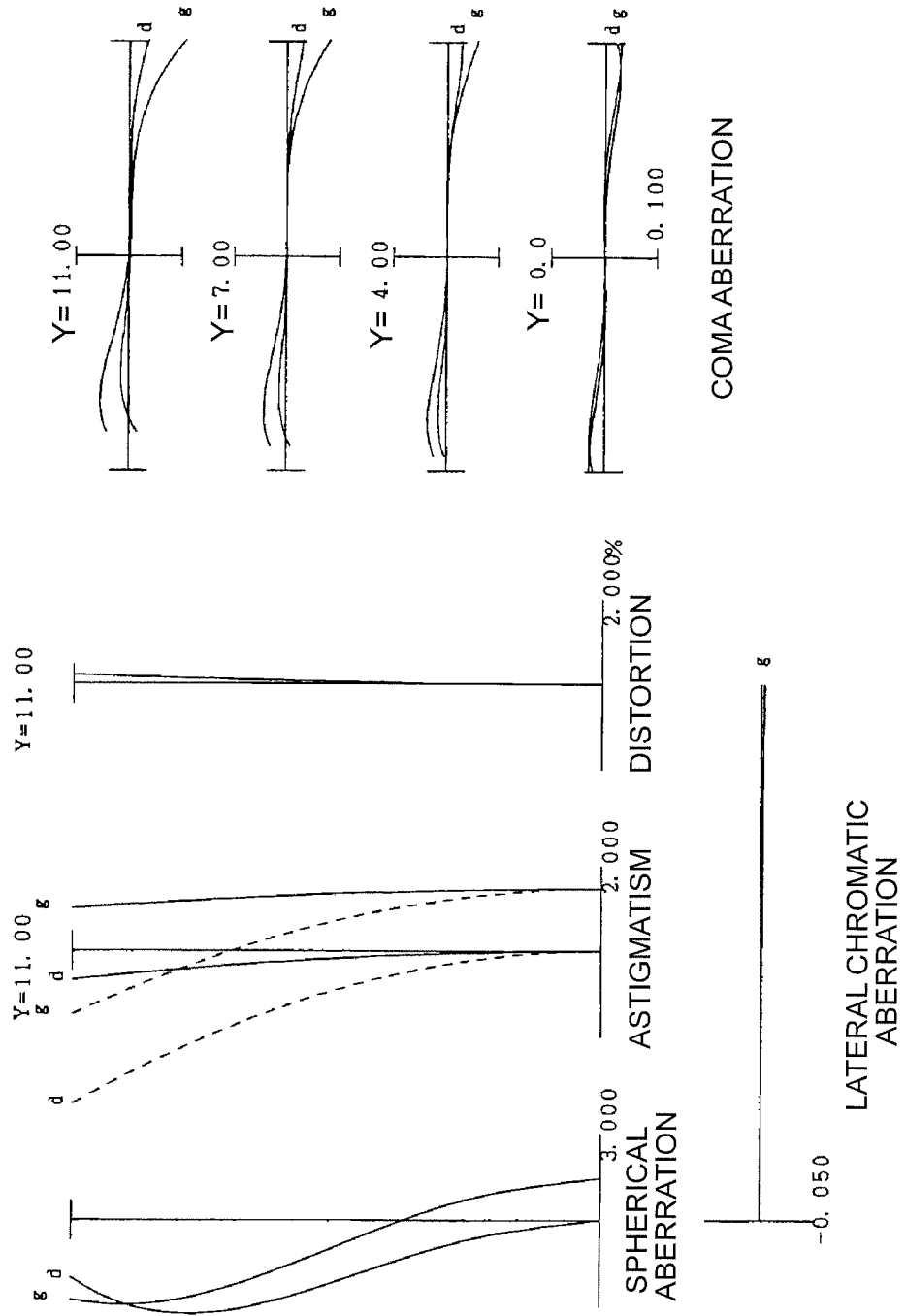

FIGS. 6A to 6C are graphs showing various aberrations of the variable power optical system according to Example 3, where FIG. 6A shows a lowest magnification state (f=63.0000), FIG. 6B shows an intermediate magnification state (f=320.0000), and FIG. 6C shows a highest magnification state (f=1000.0000). As seen in each graph showing aberrations, in Example 3, various aberrations are corrected well in each magnification state from the highest magnification state to the lowest magnification state, indicating that this variable power optical system has a superb optical performance.

Example 4

Figure 7A:
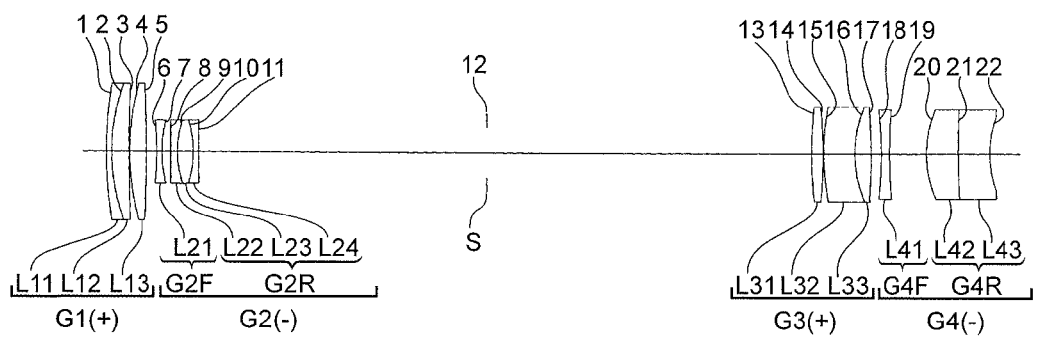
FIGS. 7A to 7C are cross-sectional views depicting a configuration of a variable power optical system according to Example 4, where
Figure 7B:
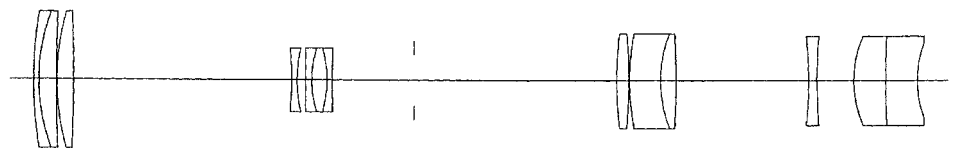
Figure 7C:
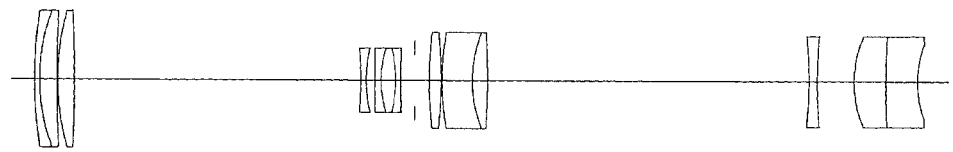

Example 4 will now be described with reference to FIGS. 7A to 7C, FIGS. 8A to 8C and Table 4. FIGS. 7A to 7C are diagrams depicting the lens according to Example 4, where FIG. 7A shows a lowest magnification state (f=60.0000), FIG. 7B shows an intermediate magnification state (f=320.0000), and FIG. 7C shows a highest magnification state (f=1320.0000). As FIGS. 7A to 7C show, the variable power optical system according to Example 4 has, in order from the object, a first lens group G1 having positive refractive power, a second lens group G2 having negative refractive power, an aperture stoop S, a third lens group G3 having positive refractive power, and a fourth lens group G4 having negative refractive power.

The first lens group G1 has, in order from the object, a cemented lens of a negative meniscus lens L11 having a convex surface facing the object and a positive meniscus lens L12 having a convex surface facing the object, and a biconvex lens L13. The second lens group G2 has, in order from the object, a front group G2F which includes a biconcave lens L21, and has a negative refractive power, and a rear group G2R which includes an achromatic cemented lens of a biconcave lens L22, a biconvex lens L23 and a biconcave lens L24. The third lens group G3 has, in order from the object, a biconvex lens L31, and a cemented lens of a negative meniscus lens L32 having a convex surface facing the object and a biconvex lens L33. The fourth lens group G4 has, in order from the object, a front group G4F which includes a biconcave lens L41 and has negative refractive power, and a rear group G4R which includes a cemented lens of a positive meniscus lens L42 having a convex surface facing the object and a negative meniscus lens L43 having a convex surface facing the object.

In the variable power optical system according to this example having the above configuration, upon zooming from the lowest magnification state to the highest magnification state, the first lens group G1 and the fourth lens group G4 are fixed, the second lens group G2 is moved to the image side and the third lens group G3 is moved to the object side.

Table 4 below shows each data of the variable power optical system according to Example 4. The surface members 1 to 22 in Table 4 correspond to the surfaces 1 to 22 in FIGS. 7A to 7C.

TABLE 4

[General Data]

|   | Lowest magnification state | Intermediate magnification state | Highest magnification state |
|---|---|---|---|
| f | 60.0000~ | 320.0000~ | 1320.0000 |
| FNO | 17.98~ | 24.63~ | 52.51 |

TABLE 4-continued

[Lens Data]

| Surface number | r | d | vd | nd |
|---|---|---|---|---|
|  |  | d0 |  |  |
| 1 | 81.5794 | 1.0000 | 42.72 | 1.834810 |
| 2 | 39.4084 | 3.2238 | 82.56 | 1.497820 |
| 3 | 287.8836 | 0.1500 |  |  |
| 4 | 50.0571 | 3.2788 | 82.56 | 1.497820 |
| 5 | −322.0492 | d5 |  |  |
| 6 | −61.7273 | 1.0000 | 35.71 | 1.902650 |
| 7 | 25.1793 | 1.6364 |  |  |
| 8 | −48.5920 | 1.2135 | 70.45 | 1.487490 |
| 9 | 19.1110 | 2.9464 | 32.27 | 1.738000 |
| 10 | −21.6847 | 1.0000 | 57.36 | 1.670000 |
| 11 | 196.2649 | d11 |  |  |
| 12 | 0.0000 | d12 | (Aperture stop S) | |
| 13 | 76.1594 | 2.2658 | 82.56 | 1.497820 |
| 14 | −92.9840 | 0.1500 |  |  |
| 15 | 50.9968 | 5.7558 | 34.71 | 1.720467 |
| 16 | 23.5607 | 2.9688 | 82.56 | 1.497820 |
| 17 | −142.8948 | d17 |  |  |
| 18 | −78.5974 | 1.6409 | 56.32 | 1.568830 |
| 19 | 103.7739 | 7.2740 |  |  |
| 20 | 21.4911 | 6.0000 | 35.30 | 1.592700 |
| 21 | 174.2473 | 6.0000 | 47.38 | 1.788000 |
| 22 | 19.5467 | 7.0000 |  |  |

[Variable Distance Data]

|   | Lowest magnification state | Intermediate magnification state | Highest magnification state |
|---|---|---|---|
| f | 60.0000 | 320.0000 | 1320.0000 |
| d0 | 0.0000 | 0.0000 | 0.0000 |
| d5 | 2.0203 | 41.1667 | 54.2305 |
| d11 | 54.9548 | 15.8085 | 2.7446 |
| d12 | 61.5439 | 38.5006 | 2.7589 |
| d17 | 1.9831 | 25.0264 | 60.7681 |

[Conditional expression correspondence value]

| Conditional expression (1) | f2F/f2 = 0.929 |
| Conditional expression (2) | q2 = −0.421 |
| Conditional expression (3) | f2/f1 = −0.241 |
| Conditional expression (4) | T360 = 0.74 |
| Conditional expression (5) | vd2 = 32.3 |
| Conditional expression (6) | |q4| = 21.11 |
| Conditional expression (7) | PgF2 = 0.5899 |
| Conditional expression (8) | vd4 = 35.3 |
| Conditional expression (9) | nd4 = 1.59270 |

As the data in Table 4 shows, all the conditional expressions (1) to (9) are satisfied in the variable power optical system according to Example 4.

Figure 8A:
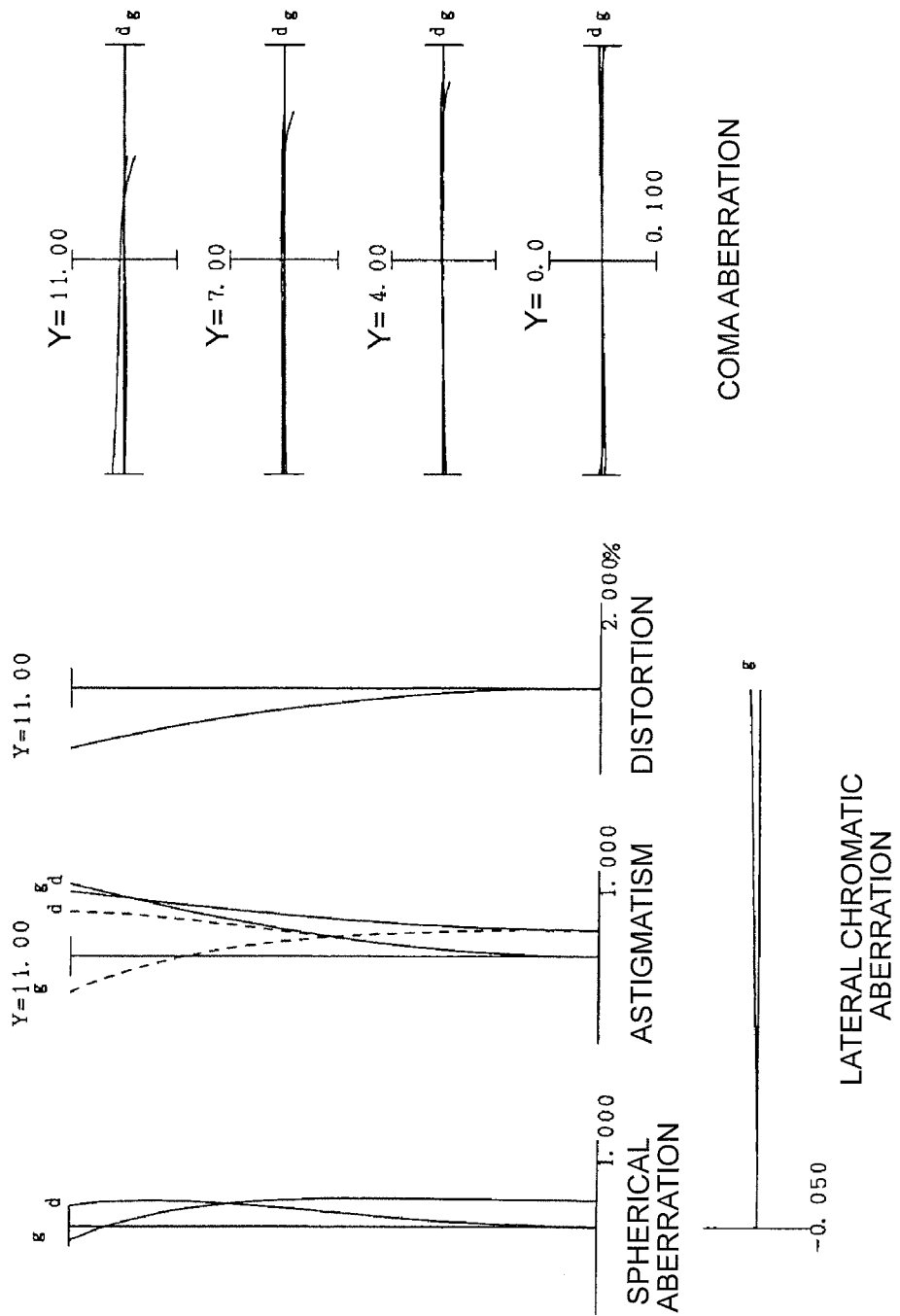
Figure 8C:
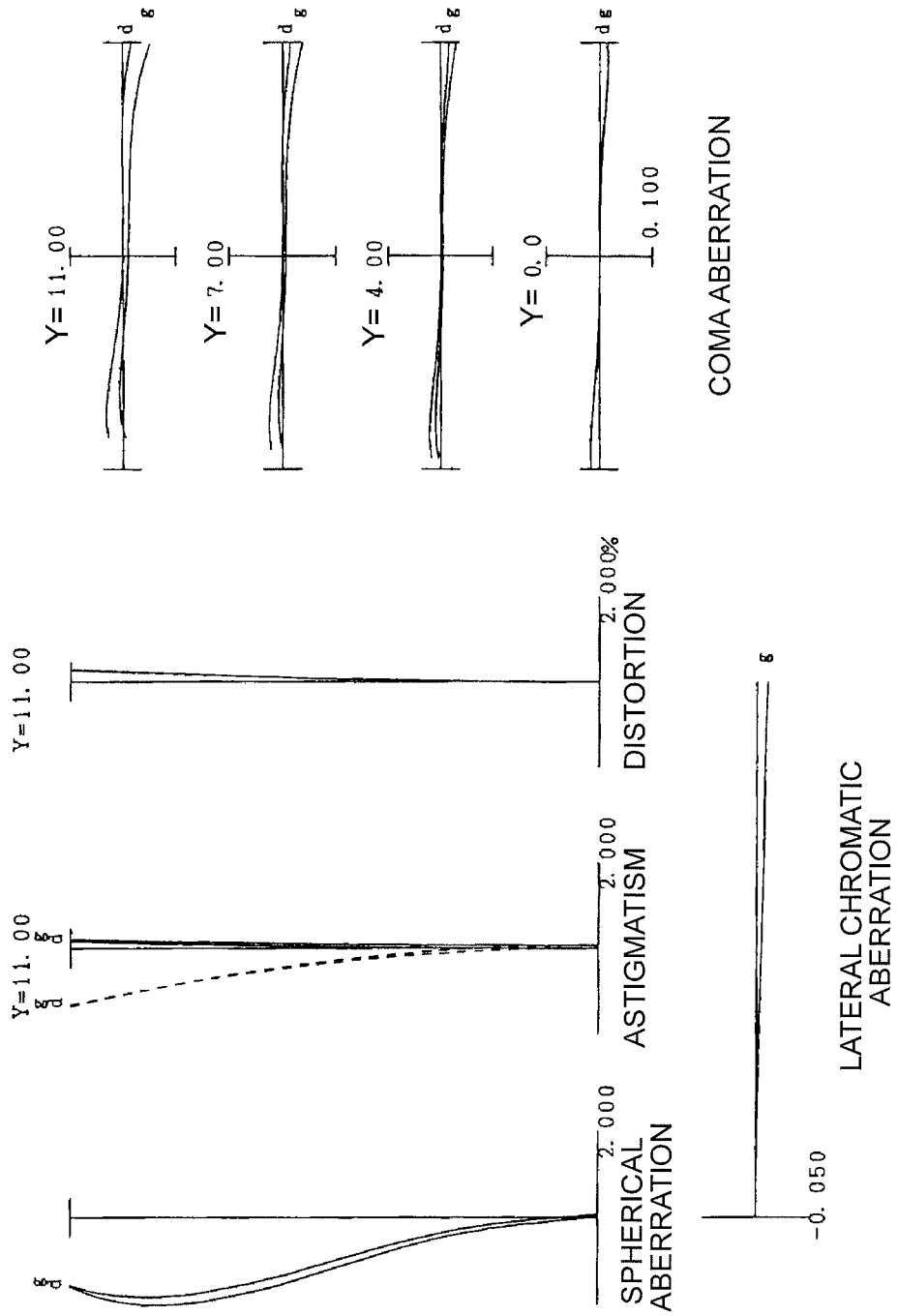

FIGS. 8A to 8C are graphs showing various aberrations of the variable power optical system according to Example 4, where FIG. 8A shows a lowest magnification state (f=60.0000), FIG. 8B shows an intermediate magnification state (f=320.0000), and FIG. 8C shows a highest magnification state (f=1320.0000). As seen in each graph showing aberrations, in Example 4, various aberrations are corrected well in each magnification state from the highest magnification state to the lowest magnification state, indicating that this variable power optical system has a superb optical performance.

Example 5

Figure 9A:
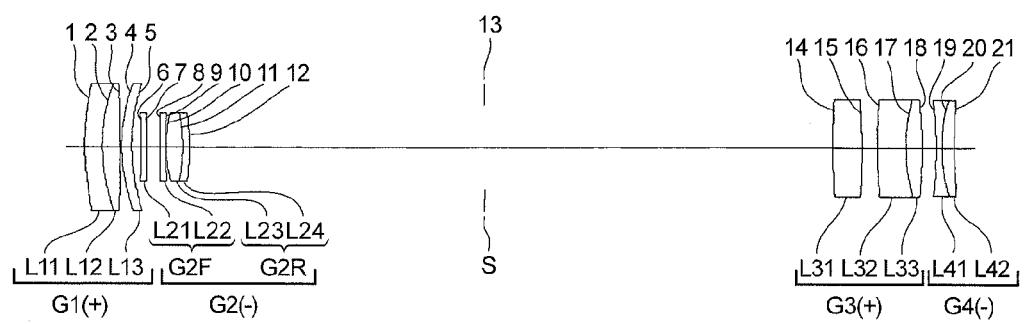
FIGS. 9A to 9C are cross-sectional views depicting a configuration of a variable power optical system according to Example 5, where
Figure 9B:
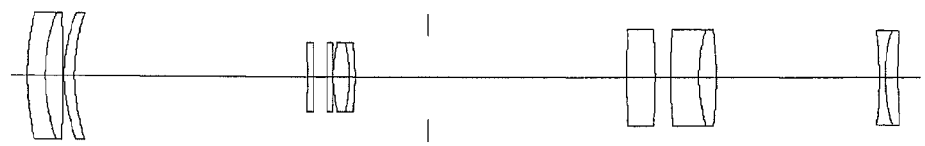
Figure 9C:
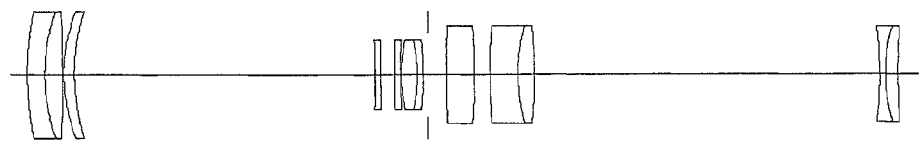

Example 5 will now be described with reference to FIGS. 9A to 9C, FIGS. 10A to 10C and Table 5. FIGS. 9A to 9C are diagrams depicting the lens according to Example 5, where FIG. 9A shows a lowest magnification state (f=50.4000), FIG. 9B shows an intermediate magnification state (f=255.4000), and FIG. 9C shows a highest magnification state (f=806.4000). As FIGS. 9A to 9C show, the variable power optical system according to Example 5 has, in order from the object, a first lens group G1 having positive refractive power, a second lens group G2 having negative refractive power, an aperture stoop S, a third lens group G3 having positive refractive power, and a fourth lens group G4 having negative refractive power.

The first lens group G1 has, in order from the object, a cemented lens of a negative meniscus lens L11 having a convex surface facing the object and a biconvex lens L12, and a positive meniscus lens L13 having a convex surface facing the object. The second lens group G2 has, in order from the object, a front group G2F which includes a biconcave lens L21 and a biconcave lens L22, and has a negative refractive power, and a rear group G2R which includes an achromatic cemented lens of a biconvex lens L23 and a negative meniscus lens L24 having a concave surface facing the object. The third lens group G3 has, in order from the object, a biconvex lens L31, and a cemented lens of a negative meniscus lens L32 having a convex surface facing the object and a biconvex lens L33. The fourth lens group G4 has a biconcave lens L41 and a positive meniscus lens L42 having a convex surface facing the object.

In the variable power optical system according to this example having the above configuration, upon zooming from the lowest magnification state to the highest magnification state, the first lens group G1 and the fourth lens group G4 are fixed, the second lens group G2 is moved to the image side and the third lens group G3 is moved to the object side. Table 5 shows each data of the variable power optical system according to Example 5. The surface members 1 to 21 in Table 5 correspond to the surfaces 1 to 21 in FIGS. 9A to 9C.

TABLE 5

[General Data]

| | Lowest magnification state | Intermediate magnification state | Highest magnification state |
|---|---|---|---|
| f | 50.4000~ | 255.4000~ | 806.4000 |
| FNO | 15.83~ | 22.58~ | 41.89 |

[Lens Data]

| Surface number | r | d | vd | nd |
|---|---|---|---|---|
| | | d0 | | |
| 1 | 53.8702 | 3.0654 | 42.72 | 1.834810 |
| 2 | 31.6153 | 3.2177 | 82.56 | 1.497820 |
| 3 | −228.3800 | 0.1500 | | |
| 4 | 28.7188 | 1.8757 | 82.56 | 1.497820 |
| 5 | 35.1807 | d5 | | |
| 6 | −115.1220 | 1.0000 | 46.58 | 1.804000 |
| 7 | 14.6475 | 2.3715 | | |
| 8 | −35.7682 | 1.0000 | 46.58 | 1.804000 |
| 9 | 109.2343 | 0.1500 | | |
| 10 | 26.3386 | 2.8565 | 32.27 | 1.738000 |
| 11 | −28.2457 | 1.0715 | 68.33 | 1.592400 |
| 12 | −55.9329 | d12 | | |
| 13 | 0.0000 | d13 | (Aperture stop S) | |
| 14 | 144.2578 | 5.0000 | 71.31 | 1.569070 |
| 15 | −106.3280 | 2.7622 | | |
| 16 | 82.6294 | 5.0000 | 32.27 | 1.738000 |
| 17 | 29.5478 | 2.9283 | 71.31 | 1.569070 |
| 18 | −88.9623 | d18 | | |
| 19 | −77.9499 | 1.0000 | 57.36 | 1.670000 |
| 20 | 27.0867 | 2.1691 | 35.33 | 1.749505 |
| 21 | 95.2686 | 8.0000 | | |

TABLE 5-continued

[Variable Distance Data]

| | Lowest magnification state | Intermediate magnification state | Highest magnification state |
|---|---|---|---|
| f | 50.4000 | 255.4000 | 806.4000 |
| d0 | 0.0000 | 0.0000 | 0.0000 |
| d5 | 1.6437 | 40.8510 | 52.8087 |
| d12 | 51.9085 | 12.7012 | 0.7435 |
| d13 | 61.5685 | 35.2907 | 3.2384 |
| d18 | 2.5104 | 28.7882 | 60.8405 |

[Conditional expression correspondence value]

| | |
|---|---|
| Conditional expression (1) | f2F/f2 = 0.430 |
| Conditional expression (2) | q2 = −0.774 |
| Conditional expression (3) | f2/f1 = −0.257 |
| Conditional expression (4) | T360 = 0.74 |
| Conditional expression (5) | vd2 = 32.3 |

Figure 10A:
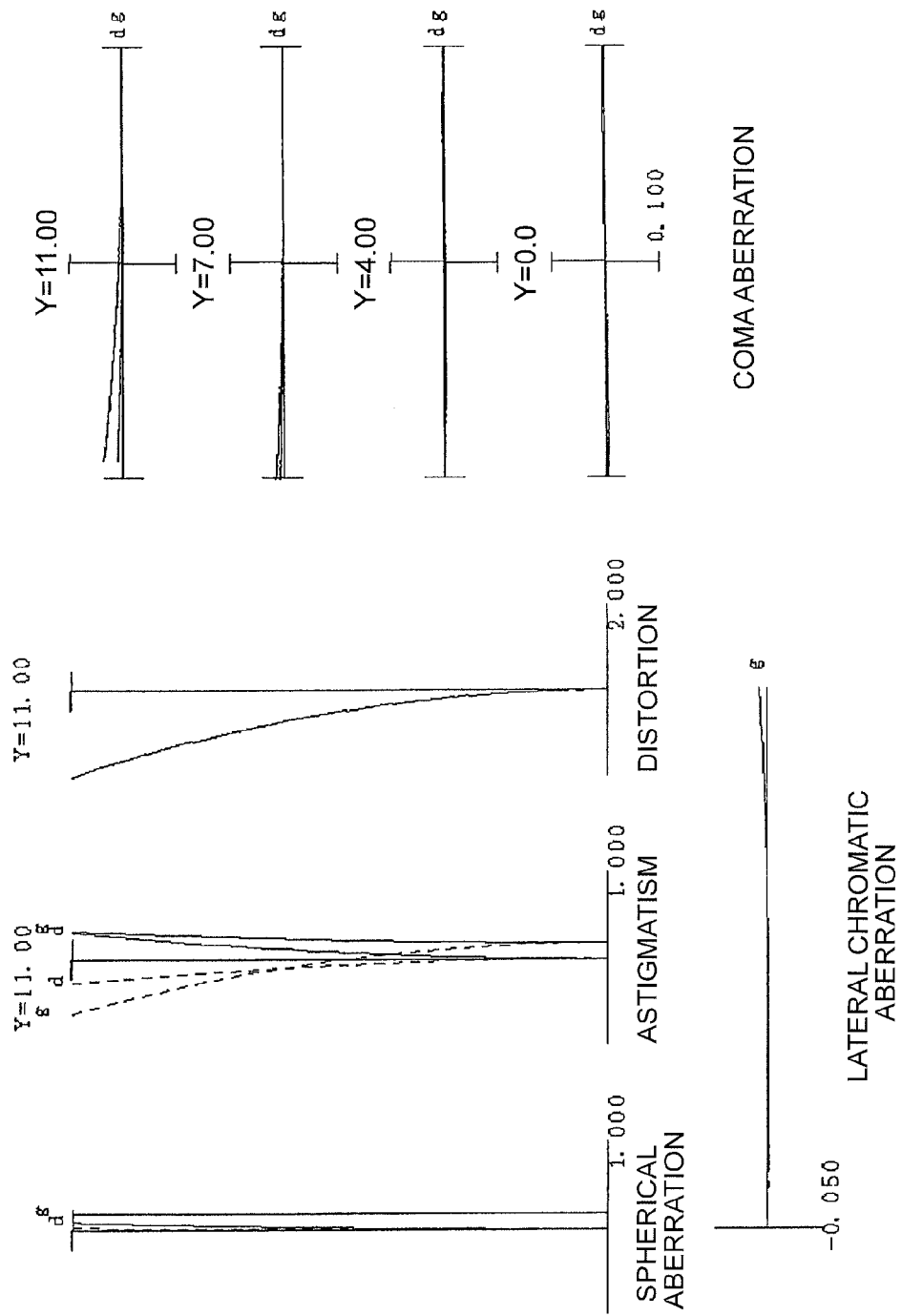
FIGS. 10A to 10C are graphs showing various aberrations of the variable power optical system according to Example 5, where
Figure 10B:
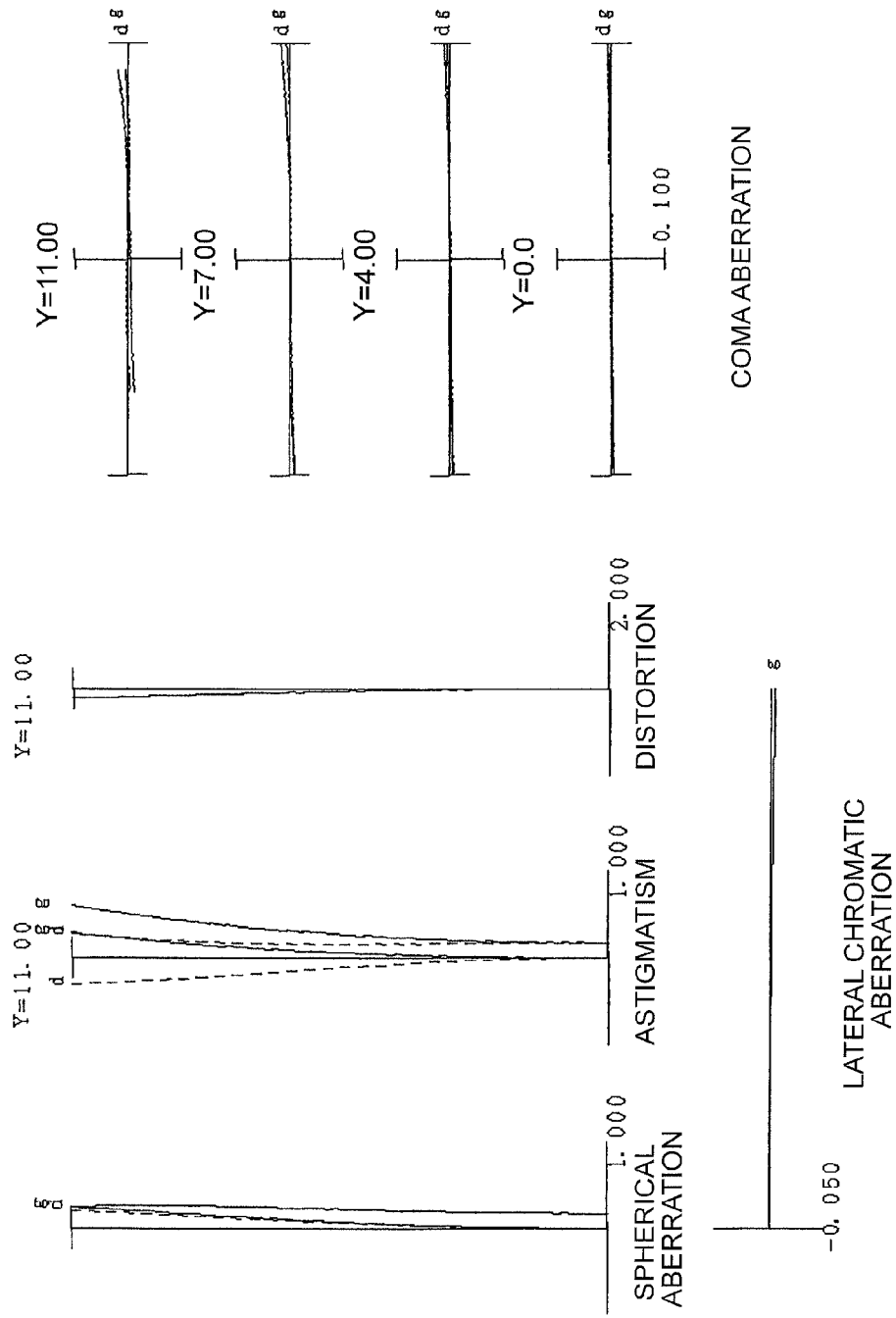
Figure 10C:
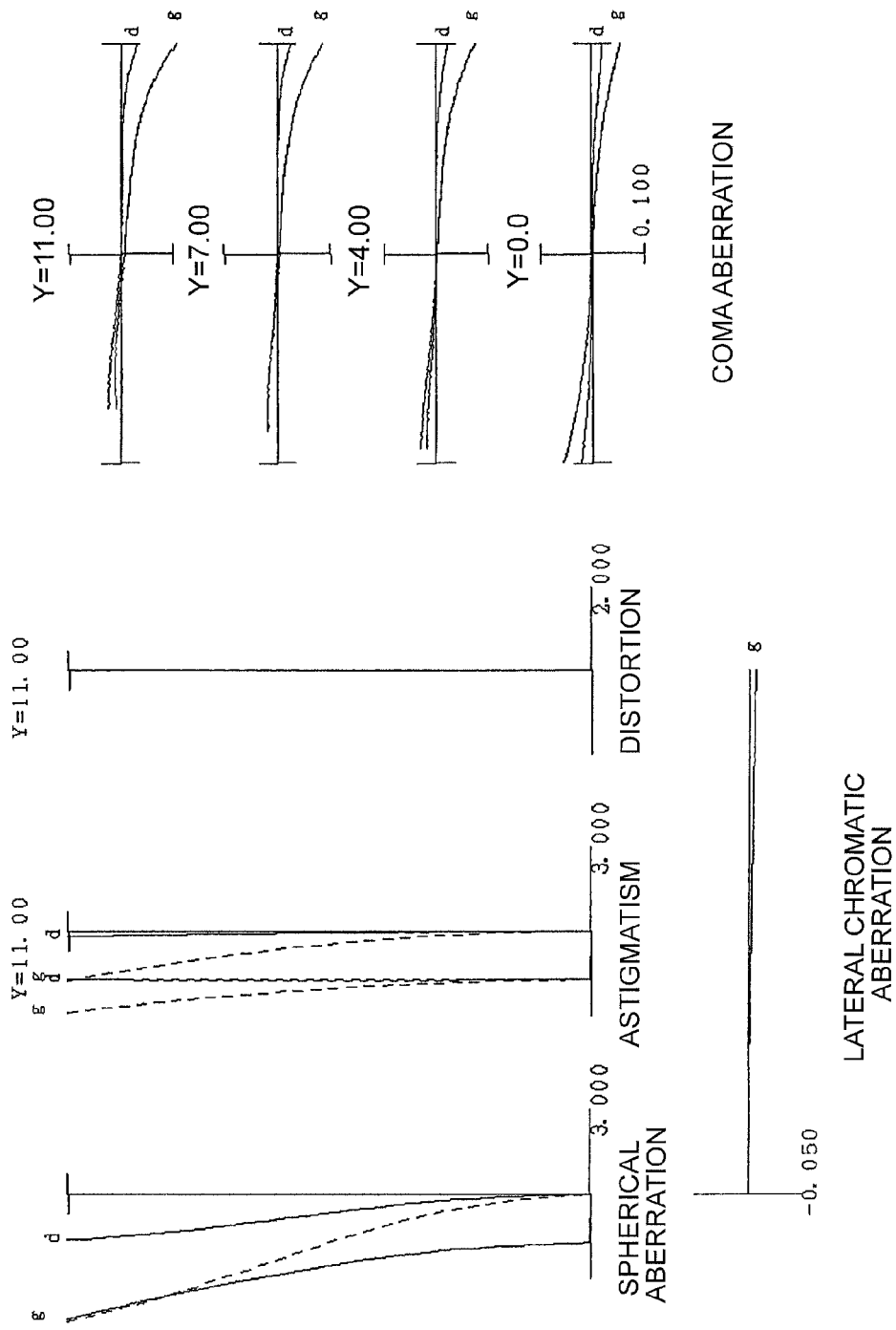

As the data in Table 5 shows, all the conditional expressions (1) to (5) are satisfied in the variable power optical system according to Example 5. FIGS. 10A to 10C are graphs showing various aberrations of the variable power optical system according to Example 5, where FIG. 10A shows a lowest magnification state (f=50.4000), FIG. 10B shows an intermediate magnification state (f=255.4000), and FIG. 10C shows a highest magnification state (f=806.4000). As seen in each graph showing aberrations, in Example 5, various aberrations are corrected well in each magnification state from the highest magnification state to the lowest magnification state, indicating that this variable power optical system has a superb optical performance.

Example 6

Figure 11A:
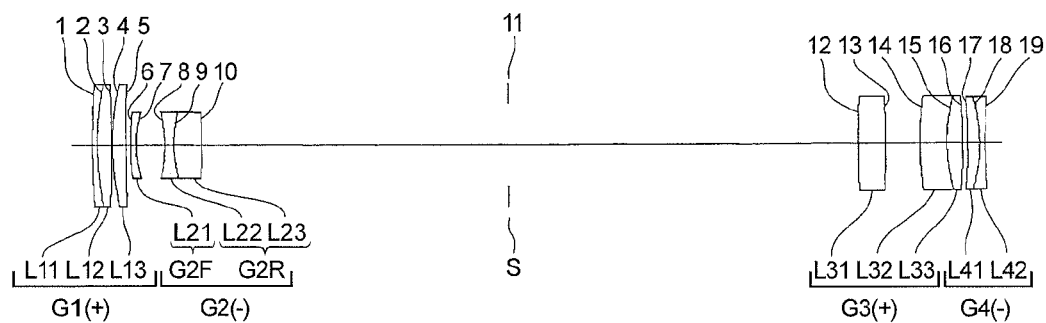
FIGS. 11A to 11C are cross-sectional views depicting a configuration of a variable power optical system according to Example 6, where
Figure 11B:
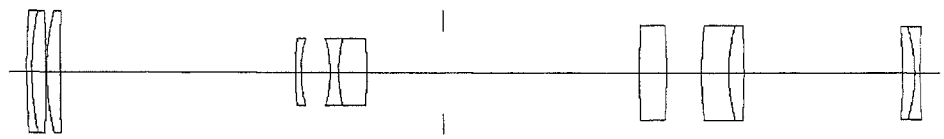
Figure 11C:
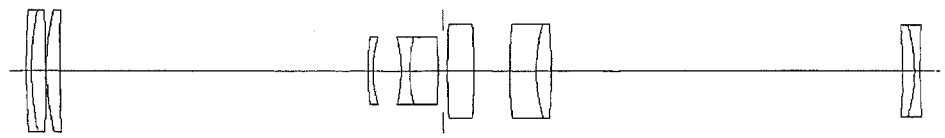

Example 6 will now be described with reference to FIGS. 11A to 11C, FIGS. 12A to 12C and Table 6. FIGS. 11A to 11C are diagrams depicting the lens according to Example 6, where FIG. 11A shows a lowest magnification state (f=50.4000), FIG. 11B shows an intermediate magnification state (f=252.4000), and FIG. 11C shows a highest magnification state (f=806.4000). As FIGS. 11A to 11C show, the variable power optical system according to Example 6 has, in order from the object, a first lens group G1 having positive refractive power, a second lens group G2 having negative refractive power, an aperture stoop S, a third lens group G3 having positive refractive power, and a fourth lens group G4 having negative refractive power.

The first lens group G1 has, in order from the object, a cemented lens of a negative meniscus lens L11 having a convex surface facing the object and a positive meniscus lens L12 having a convex surface facing the object, and a positive meniscus lens L13 having a convex surface facing the object. The second lens group G2 has, in order from the object, a front group G2F which includes a negative meniscus lens L21 having a convex surface facing the object, and has a negative refractive power, and a rear group G2R which includes an achromatic cemented lens of a biconcave lens L22 and a biconvex lens L23. The third lens group G3 has, in order from the object, a biconvex lens L31, and a cemented lens of a negative meniscus lens L32 having a convex surface facing the object and a biconvex lens L33. The fourth lens group G4 has a cemented lens of a positive meniscus lens L41 having a concave surface facing the object and a biconcave lens L42.

In the variable power optical system according to this example having the above configuration, upon zooming from the lowest magnification state to the highest magnification state, the first lens group G1 and the fourth lens group G4 are fixed, the second lens group G2 is moved to the image side and the third lens group G3 is moved to the object side. Table 6 shows each data of the variable power optical system according to Example 6. The surface members 1 to 19 in Table 6 correspond to the surfaces 1 to 19 in FIGS. 11A to 11C.

TABLE 6

[General Data]

| | Lowest magnification state | Intermediate magnification state | Highest magnification state |
|---|---|---|---|
| f | 50.4000~ | 252.4000~ | 806.4000 |
| FNO | 15.69~ | 22.39~ | 42.07 |

[Lens Data]

| Surface number | r | d | vd | nd |
|---|---|---|---|---|
| | | d0 | | |
| 1 | 134.0840 | 1.0000 | 42.72 | 1.834810 |
| 2 | 53.2279 | 2.6938 | 82.56 | 1.497820 |
| 3 | −335.8070 | 0.1500 | | |
| 4 | 45.5850 | 2.4500 | 82.56 | 1.497820 |
| 5 | 210.0983 | d5 | | |
| 6 | 49.1503 | 1.0000 | 46.58 | 1.804000 |
| 7 | 19.4288 | 5.2550 | | |
| 8 | −24.7077 | 1.6091 | 68.33 | 1.592400 |
| 9 | 23.9940 | 5.0000 | 32.27 | 1.738000 |
| 10 | −146.7920 | d10 | | |
| 11 | 0.0000 | d11 | (Aperture stop S) | |
| 12 | 167.1732 | 5.0000 | 71.31 | 1.569070 |
| 13 | −126.2240 | 6.3761 | | |
| 14 | 71.7975 | 5.0000 | 32.27 | 1.738000 |
| 15 | 30.3223 | 2.8264 | 71.31 | 1.569070 |
| 16 | −110.3420 | d16 | | |
| 17 | −74.8231 | 2.0590 | 35.33 | 1.749505 |
| 18 | −28.1913 | 1.0000 | 57.36 | 1.670000 |
| 19 | 127.0133 | 8.0000 | | |

[Variable Distance Data]

| | Lowest magnification state | Intermediate magnification state | Highest magnification state |
|---|---|---|---|
| f | 50.4000 | 252.4000 | 806.4000 |
| d0 | 0.0000 | 0.0000 | 0.0000 |
| d5 | 1.0096 | 43.3310 | 56.5269 |
| d10 | 56.2825 | 13.9612 | 0.7653 |
| d11 | 64.1268 | 35.9252 | 0.7570 |
| d16 | 1.0670 | 29.2686 | 64.4368 |

[Conditional expression correspondence value]

| Conditional expression (1) | f2F/f2 = 1.536 |
|---|---|
| Conditional expression (2) | q2 = −2.307 |
| Conditional expression (3) | f2/f1 = −0.263 |
| Conditional expression (4) | T360 = 0.74 |
| Conditional expression (5) | vd2 = 32.3 |

As the data in Table 6 shows, all the conditional expressions (1) to (5) are satisfied in the variable power optical system according to Example 6. FIGS. 12A to 12C are graphs showing various aberrations of the variable power optical system according to Example 6, where FIG. 12A shows a lowest magnification state (f=50.4000), FIG. 12B shows an intermediate magnification state (f=252.4000), and FIG. 12C shows a highest magnification state (f=806.4000). As seen in each graph showing aberrations, in Example 6, various aberrations are corrected well in each magnification state from the highest magnification state to the lowest magnification state, indicating that this variable power optical system has a superb optical performance.

Now an image optical system which is used in combination with the variable power optical system according to each example will be described, with reference to FIG. 13 and Table 7. As FIG. 13 shows, the image optical system has, in order from the object, a cemented lens of a biconvex lens L11 and a negative meniscus lens L12 having a concave surface facing the object, and a plane parallel glass block L12. Table 7 shows the data values of this image optical system. In Table 7, f' is a focal length of the entire image optical system. The rest of the description is the same as Table 1 to Table 6.

TABLE 7

[Lens Data]
f' = 200

| surface number | radius of curvature | surface distance | vd | nd |
|---|---|---|---|---|
| 1 | 212.0000 | 3.0000 | 82.56 | 1.497820 |
| 2 | −65.1000 | 2.0000 | 41.49 | 1.575010 |
| 3 | −150.0000 | 2.0000 | | |
| 4 | 0.0000 | 22.0000 | 56.32 | 1.568830 |
| 5 | 0.0000 | | | |

As shown above, the variable power region is about 16 times to 25 times, although the maximum numerical aperture of the objective optical system (f=80 mm) is 0.15 or more, that is, the variable power optical system for a parallel system stereomicroscope having good optical performance can be provided.

The embodiment was described using the configuration requirements to clearly explain various embodiments of the present invention, but needless to say, various embodiments of the present invention are not limited to this embodiment.

For example, it is sufficient if the second lens group G2 and the third lens group G3 are constructed to move in opposite directions along the optical axis in at least a part of the variable power block, and the second lens group G2 and the third lens group G3 may be constructed to move (decentering movement) so as to have components orthogonal to the optical axis in the rest of the variable power block.

DESCRIPTION OF SYMBOLS

G1 first lens group
G2 second lens group
G2F front group (of the second lens group)
G2R rear group (of the second lens group)
G3 third lens group
G4 fourth lens group
G4F front group (of the fourth lens group)
G4R rear group (of the fourth lens group)
S aperture stop The many features and advantages of embodiments of the present invention are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A variable power optical system for a stereomicroscope comprising, in order from an object:
a first lens group having positive refractive power;

a second lens group having negative refractive power;
a third lens group having positive refractive power; and
a fourth lens group having negative refractive power,
the second lens group including, in order from the object, a front group having negative refractive power and a rear group having an achromatic cemented lens including a positive lens and a negative lens,
the second lens group and the third lens group moving in opposite directions along an optical axis at least in a part of a variable power block, and
the following conditional expressions being satisfied:

$$0.4 < f2F/f2 \leq 1.105$$

$$-3.0 < q2 < -0.3$$

where f2 denotes a focal length of the second lens group, f2F denotes a focal length of the front group, q2 denotes a form factor of a negative lens disposed closest to the object in the front group, the form factor q2 is defined by $q2 = (r22+r21)/(r22-r21)$, where r21 denotes a radius of curvature of an object side lens surface of the negative lens in the front group, and r22 denotes a radius of curvature of an image side lens surface of the negative lens in the front group.

2. The variable power optical system for a stereomicroscope according to claim 1, wherein
the first lens group includes a negative lens disposed closest to the object, and
the following conditional expression is satisfied:

$$-0.3 < f2/f1 < -0.2$$

where f1 denotes a focal length of the first lens group, and f2 denotes a focal length of the second lens group.

3. The variable power optical system for a stereomicroscope according to claim 2, wherein
the positive lens constituting the cemented lens in the rear group of the second lens group satisfies the following conditional expressions:

$$T360 \geq 0.5$$

$$vd2 < 40$$

where T360 denotes an internal transmittance at wavelength 360 nm without reflection loss when a thickness of an optical material to be used is 10 mm, and vd2 denotes an Abbe number of the optical material to be used.

4. The variable power optical system for a stereomicroscope according to claim 1, wherein
the positive lens constituting the cemented lens in the rear group of the second lens group satisfies the following conditional expressions:

$$T360 \geq 0.5$$

$$vd2 < 40$$

where T360 denotes an internal transmittance at wavelength 360 nm without reflection loss when a thickness of an optical material to be used is 10 mm, and vd2 denotes an Abbe number of the optical material to be used.

5. A variable power optical system for a stereomicroscope comprising, in order from an object:
a first lens group having positive refractive power;
a second lens group having negative refractive power;
a third lens group; and
a fourth lens group,
the second lens group including, in order from the object, a front group having negative refractive power and a rear group, and
the following conditional expressions being satisfied:

$$0.4 < f2F/f2 \leq 1.105$$

$$-0.3 < f2/f1 < -0.2$$

where f2 denotes a focal length of the lens group, f2F denotes a focal length of the front group constituting the second lens group, and f1 denotes a focal length of the first lens group.

6. A variable power optical system according to claim 5, wherein the lens group further comprises:
a rear group having an achromatic cemented lens including a positive lens and a negative lens.

7. A stereomicroscope comprising the variable power optical system according to claim 5.

* * * * *